United States Patent [19]

Kim et al.

[11] Patent Number: 5,245,892
[45] Date of Patent: Sep. 21, 1993

[54] TRANSMISSION OF THE FARM TRACTOR

[75] Inventors: Eui H. Kim; Hyung T. Kim, both of Kyunggi, Rep. of Korea

[73] Assignee: Gold Star Cable Co., Ltd., Seoul, Rep. of Korea

[21] Appl. No.: 848,862

[22] Filed: Mar. 10, 1992

[30] Foreign Application Priority Data

Mar. 11, 1991 [KR] Rep. of Korea .............. 91-3838

[51] Int. Cl.[5] ............ F16H 37/06; F16H 3/08; F16H 3/22
[52] U.S. Cl. ............ 74/665 GA; 74/15.4; 74/15.66; 74/331; 74/342; 74/360; 74/665 R
[58] Field of Search ............ 74/15.4, 15.66, 331, 74/342, 360, 665 R, 665 GA

[56] References Cited

U.S. PATENT DOCUMENTS

| | | | |
|---|---|---|---|
| 3,318,167 | 5/1967 | Frost | 74/331 |
| 4,351,196 | 9/1982 | Yoshida et al. | 74/15.4 |
| 4,565,102 | 1/1986 | Miyahara et al. | 74/15.4 |
| 4,572,026 | 2/1986 | Weiss | 74/360 X |
| 4,579,015 | 4/1986 | Fukui | 74/360 X |
| 4,610,174 | 9/1986 | Takagi et al. | 74/15.4 X |
| 4,667,526 | 5/1987 | Young | 74/331 |
| 4,785,682 | 11/1988 | Nishimura et al. | 74/15.66 X |
| 4,824,128 | 4/1989 | Takagi et al. | 74/15.4 X |
| 4,901,600 | 2/1990 | Wilson | 74/331 X |
| 4,938,085 | 7/1990 | Suzuki et al. | 74/15.4 X |

FOREIGN PATENT DOCUMENTS

| | | | |
|---|---|---|---|
| 61-236948 | 10/1986 | Japan | 74/331 |
| 61-244941 | 10/1986 | Japan | 74/331 |
| 62-167959 | 7/1987 | Japan | 74/331 |
| 2-97749 | 4/1990 | Japan | 74/331 |

Primary Examiner—Leslie A. Braun
Assistant Examiner—David E. Henn
Attorney, Agent, or Firm—Lackenbach Siegel Marzullo Aronson & Greenspan

[57] ABSTRACT

A transmission generates the travelling and PTO outputs of a farm tractor. The transmission can easily generate the travelling output of a 15-step forward movement and a 9-step backward movement and the output of a 4-step PTO by fractionalizing the number of speed changing steps. The transmission uses a large number of identically standardized gears and hub sleeves but reduces the number of built-in parts in each part of the transmission, raises the productivity by using a large number of the same parts and controls the equipment efficiently due to easy disassembly for maintenance.

17 Claims, 30 Drawing Sheets

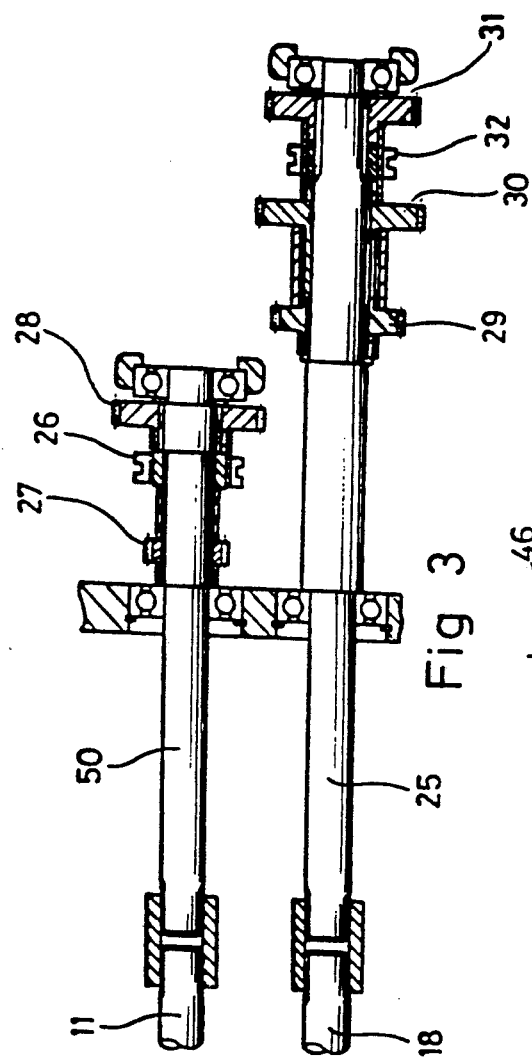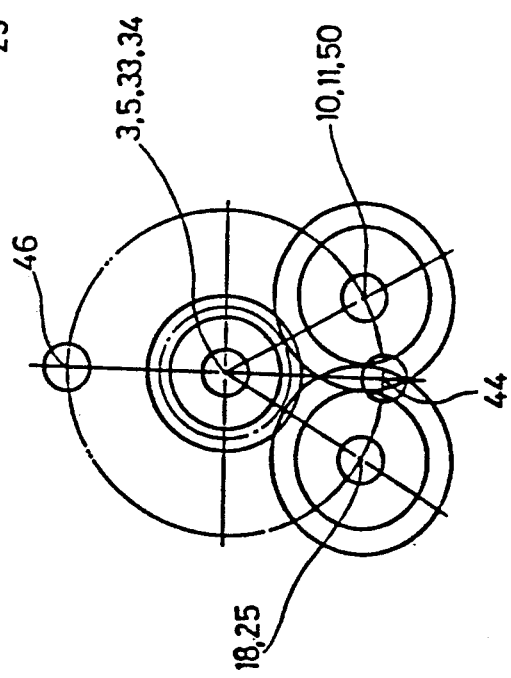

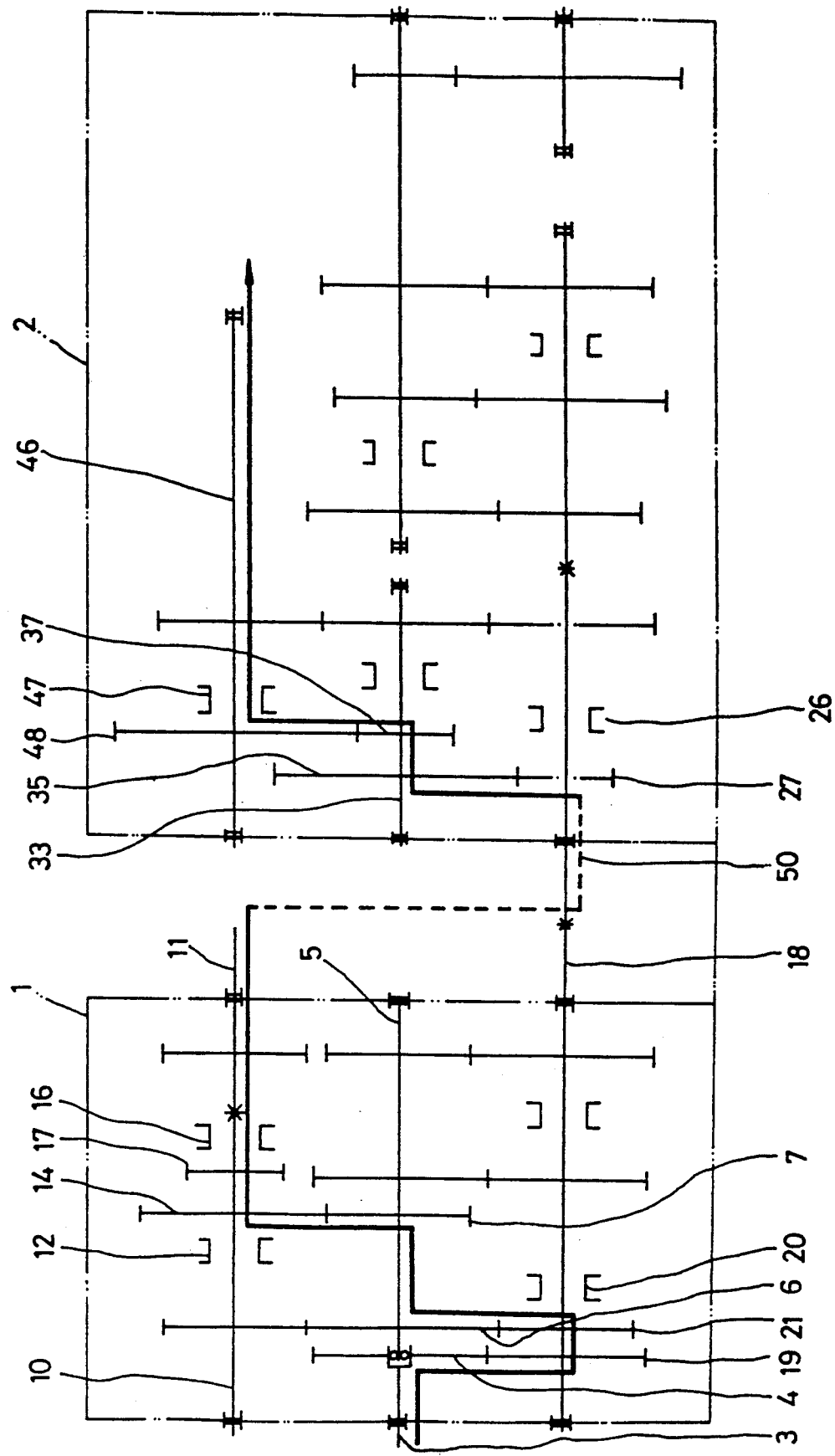

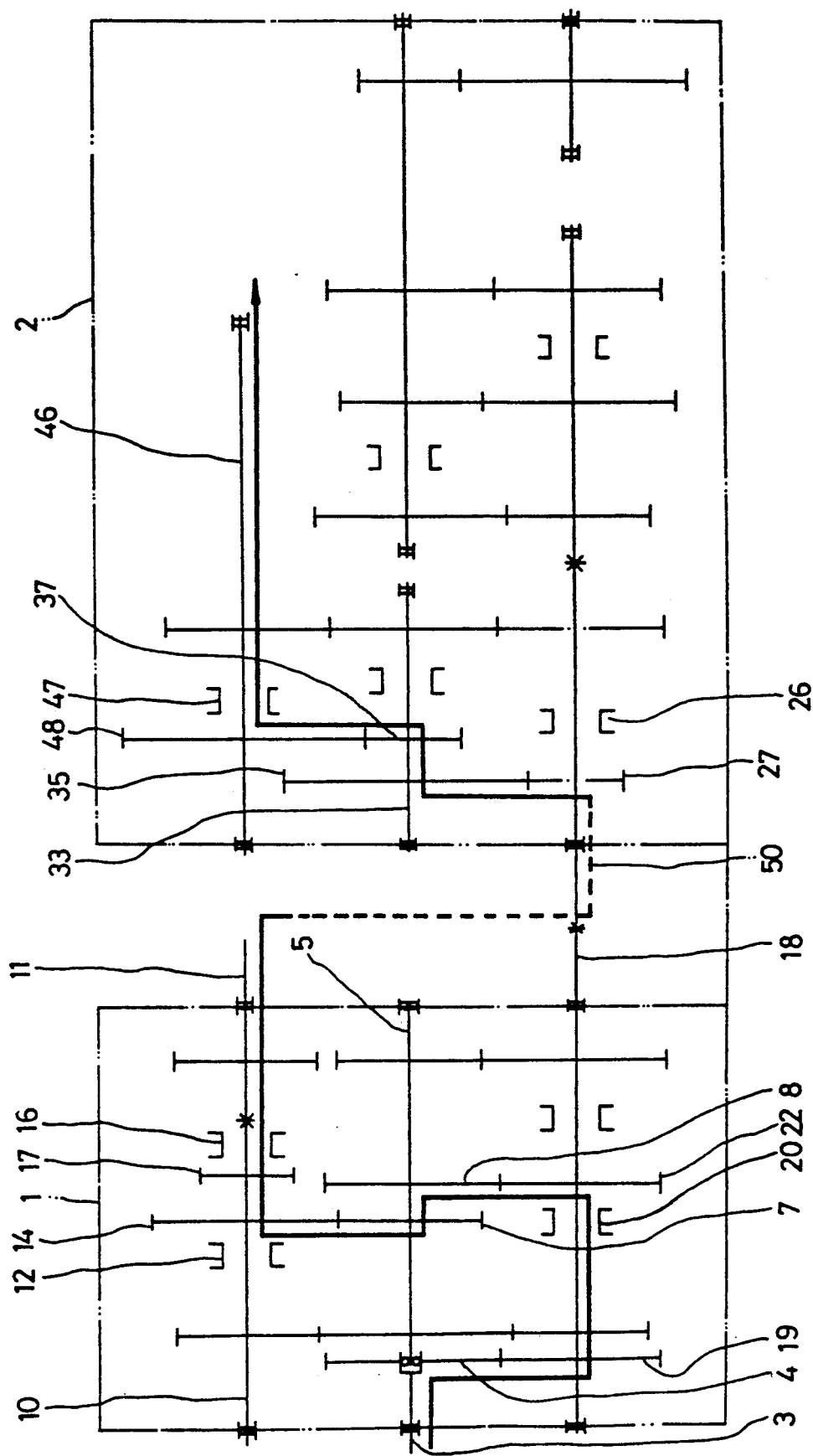

TRANSMISSION OF THE FARM TRACTOR

BACKGROUND OF THE INVENTION

1. Field of the Invention

The present invention relates to a transmission used to power a farm tractor, namely, in drawing PTO output together with travelling output of a tractor. More particularly, the invention relates to a transmission for a farm tractor designed to generate an output efficiently and easily by carrying out its speed changing steps or shifting in multiple steps.

2. Description of the Prior Art

It is a recent trend that the transmissions of their farm tractors carry out their speed changing steps in multiple steps so that their moving speed may be fractionalized to generate more efficient outputs.

In the conventional transmission, however, each speed changing step involves gears of different specifications and sizes, so that their shapes are complicated and manufacturing costs are accordingly high. Moreover, disassembly work for maintenance is not so easy so that a problem is also encountered in equipment control.

In order to solve such problems, an application for a Korean patent No. 90-22141 (the same applicant) discloses a transmission provide an output of 12 forward speeds, 4 independent PTO speeds and ground PTO by repeatedly forming the number of speed changing steps of a group of gears having the same number of teeth. However, the number of speed changing steps is so small that the moving speed of a tractor is not fractionalized and enormous power is consumed in bumpy or sloped or geologically rough terrain and a strain is thereby put on the equipment.

SUMMARY OF THE INVENTION

It is therefore an object of the present invention to generate a highly fractionalized output by generally improving but simplifying mutual arrangement of gears, shafts and hub sleeves in each part of the transmission described in the aforementioned Korean application No. 90-22141.

The object of the present invention can be accomplished by using a large number of identically standardized hub sleeves. Although the present invention does not use an independent PTO and a ground speed PTO, these PTOs can be assembled in the same way disclosed in Korean Patent application No. 90-22141.

The present invention will now be described in detail according to an independent PTO and a ground PTO thereto.

The present invention will now be described in detail according to the drawings attached hereto.

BRIEF DESCRIPTION OF THE DRAWINGS

·FIG. 2 is a partial sectional view of a supplementary reduction transmission according to the present invention.

FIG. 3 is a gear shaft arrangement diagram of a transmission according to the present invention.

FIGS. 4 to 31 are outlined diagrams showing the operation of the each step of the present invention.

DESCRIPTION OF THE PREFERRED EMBODIMENT

Figure 1:
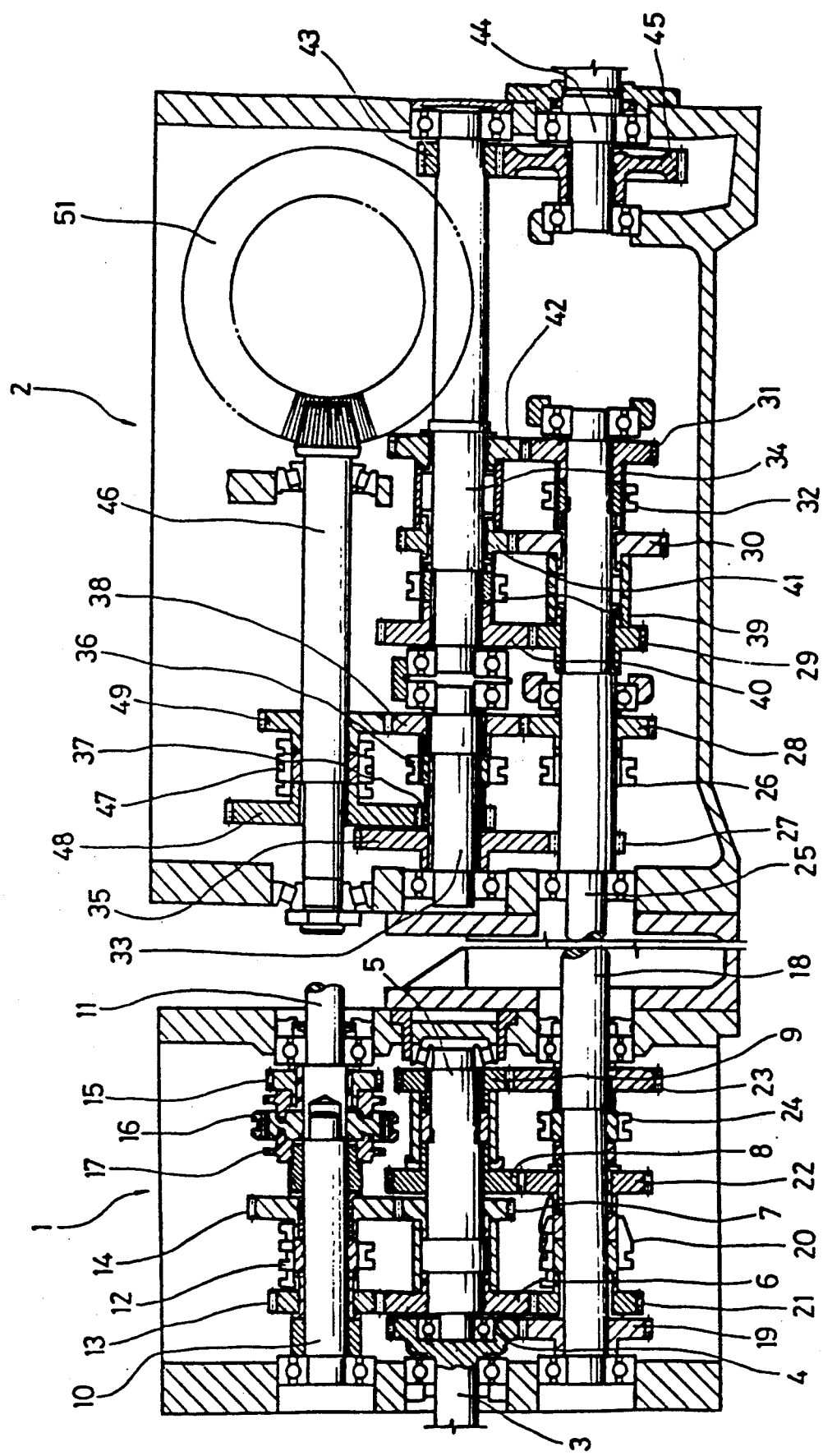
FIG. 1 is a sectional view showing the inner formation of a transmission according to the present invention.

As seen from FIG. 1 and FIG. 2, the transmission is divided into a main transmission (1) on the left and a supplementary transmission (2) on the right. A transmission shaft (5) is connected to the transmission gear (4) to be rotatably supported by fitting a first input shaft (3) with a transmission gear (4) formed as one body into the middle of main transmission (1). A forward moving input shaft (10) and a main transmission output shaft (11) are rotatably connected and installed above the transmission shaft (5) by fixing transmission gears (6)(7)(8)(9) into the transmission shaft (5) to the right of transmission gear (4) and transmission gears (13)(14) with a hub sleeve (12) interposed are movably fitted into the forward moving input shaft (10) from its left. Into the main transmission output shaft (11) is fitted a transmission gear (15). Then, a hub sleeve (16) which moves forward or backward movement is interposed between transmission gears (15)(17) and installed in the part where the forward moving input shaft (10) and the main transmission output shaft (11) are connected, but the transmission gears (6)(7) of transmission shaft (5) are arranged so as to be engaged with the transmission gears (13)(14) of the forward moving input shaft (10) respectively.

Thereafter, a PTO input shaft (18) is installed below the transmission shaft (5) but a transmission gear (19) is fixed to the PTO input shaft (18) and transmission gears (21)(22) with a hub sleeve (20) interposed between them are movably fitted thereinto to the right of the transmission gear (19) and a hub sleeve (24) is interposed between the transmission gears (22)(23) by movably fitting a transmission gear (23) from the right of PTO input shaft (18) to enable the transmission gears (19)(21)(22) of the PTO input shaft (18) to be engaged with the transmission gears (4)(6)(8) of the transmission shaft (5) respectively and the transmission gear (23) thereof to be engaged with the transmission gears (9)(15).

Subsequently, the PTO input shaft (18) is connected to a first PTO transmission shaft (25) and the first PTO transmission shaft (25) and the first PTO transmission shaft (25) is situated in the lower part of supplementary reduction transmission (2). Transmission gears (29)(30)(31) are movably fitted thereinto from the left but a hub sleeve (32) is interposed between the transmission gears (30)(31).

A transmission shaft (33) and a second PTO transmission shaft (34) are supported by being arranged to the left and right in the center of supplementary reduction transmission (2). A transmission gear (35) is tightly fitted onto the transmission shaft (33) and transmission gears (37)(38) with a hub sleeve (36) interposed between them are movably fitted thereinto. Next, transmission gears (40)(41) with a hub sleeve (39) interposed between them and a transmission gear (42) are movably fitted onto the second PTO transmission shaft (34) to be engaged with the transmission gears (29)(30)(31) of the first PTO transmission shaft (25) respectively. Thereafter, a transmission gear (43) is tightly fitted onto the right end of the second PTO transmission shaft (34) and a PTO output shaft (44) is rotatably supported in the right lower part of supplementary reduction transmission (2) and a transmission gear (45) is fixed to the PTO output shaft (44) for engaging the transmission gear (43) of the second PTO transmission shaft (34) with the transmission gear (45) of the PTO output shaft (44).

On the other hand, a travelling output shaft (46) which transmits power to a differential (51) is supported in the upper part of supplementary reduction transimission (2). Transmission gears (48)(49) with a hub sleeve (47) interposed in between are movably fitted onto the travelling output shaft (46) so as to be engaged with the transmission gears (37)(38) of the transmission shaft (33). A guide shaft (50) which transmits power at the time of travelling output is connected from the main transmission output shaft (11) and transmission gears (27)(28) with a hub sleeve (26) interposed in between are tightly and movably fitted onto the guide shaft (50) from the left to be engaged with the transmission gears (35)(38) of the transmission shaft (33) respectively, as illustrated in FIG. 2.

As heretofore described, shafts and gears in each part generate the PTO output together with travelling output of 15-step forward movement and 9-step backward movement by being united with one another. Finally, the travelling output shaft (46) moves a tractor forward or backward by transmitting power to the differential (51) and the PTO output shaft (44) drives the working implement of a tractor.

Moreover, the shafts (3)(5)(10)(11)(18)(25)(33)(34)(44)(46)(50) are arranged as shown in FIG. 3.

Referring to a group of identically standardized gears which have the same number of teeth and the identically standardized hub sleeves in such a transmission, namely, in the main and supplementary transmission, gears of the helical gear tooth type include;
first gears (7)(9)(13)(15)(21)
second gears (4)(8)
third gears (19)(22)
fourth gears (6)(14)(23)
Gears of the spur gear tooth type include;
fifth gears (27)(37)
sixth gears (35)(48)
seventh gears (28)(31)(38)(42)(49)
eighth gears (29)(31)
tenth gears (43)
eleventh gears (45), and
the same hub sleeves are (24)(26)(32)(36)(39).

The operation of the present invention will be described in detail by the speed changing steps.

Forward Movement Speed 1.

When a speed changing lever (not illustrated), for change of forward or backward movement, is placed at the forward movement position and a main speed changing lever (not illustrated) is changed to the speed 1 position, the hub sleeve (12) of the forward movement input shaft (10) in the main transmission (1) is engaged with the transmission gear (14) the forward or backward movement choosing hub sleeve (16) of main transmission output shaft (11) is synchronously engaged with the transmission gear (17), the hub sleeve (20) of the PTO output shaft (18) is engaged with the transmission gear (21) and, when a supplementary speed changing lever (not illustrated) is changed to the speed 1 position, the hub sleeve (26) of guide shaft (50) and the hub sleeve (47) of travelling shaft (46) in the supplementary reduction transmission (2) are engaged with transmission gears (27)(28) and the power of an engine (not illustrated) is transmitted in the following order of elements 3, 4, 19, 18, 21, 6, 5, 7, 14, 10, 17, 11, 50, 27, 35, 33, 37, 48, and 46, as shown in FIG. 4.

Forward Movement Speed 2.

When the main speed changing lever is changed to the speed 2 position in the forward movement speed 1 condition, the hub sleeve (20) and the hub sleeve (12) of main transmission (1) are respectively engaged with transmission gears (22)(14), the forward or backward movement choosing hub sleeve (16) is synchronously engaged with the transmission gear (17), hub sleeves (26)(47) being engaged with the transmission gears (27)(48) and the power of the engine is transmitted in the following order of elements 3, 4, 19, 18, 22, 8, 5, 7, 14, 10, 17, 11, 50, 27, 35, 33, 37, 48, and 46 as shown in FIG. 5. the Power of the supplementary reduction transmission (2) is transmitted in the same order as the supplementary speed change for the speed 1.

Forward Movement Speed 3.

Figure 6:
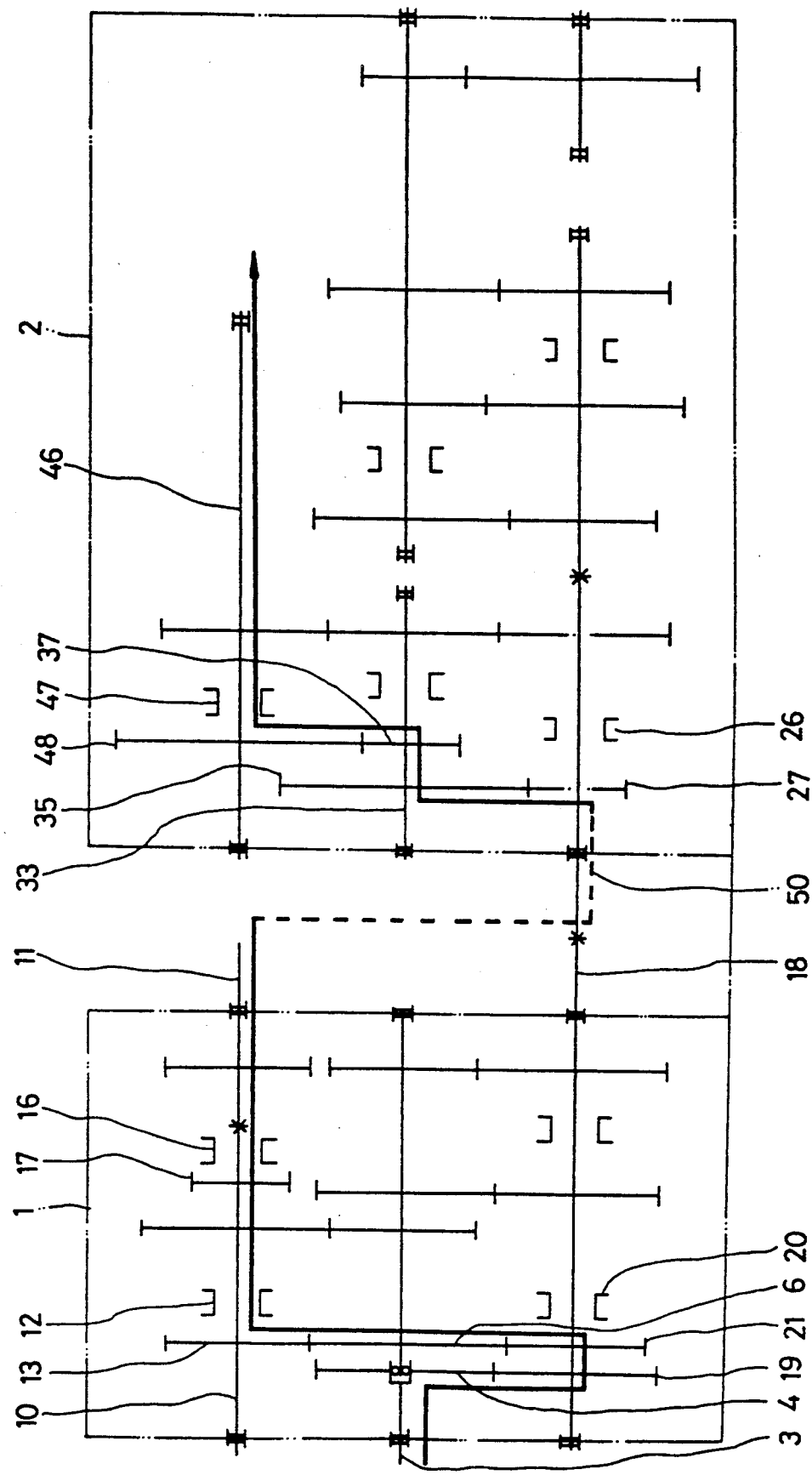

When the main speed changing lever is changed to the speed 3 position, the hub sleeve (20) and the hub sleeve (12) of main transmission (1) are respectively engaged with the transmission gears (21)(13). The forward or backward movement choosing hub sleeve (16) is synchronously engaged with the transmission gear (17), the hub sleeves (20)(47) being engaged with the transmission gears (27)(48) and engine power is transmitted in the following order of elements 3, 4, 19, 18, 21, 6, 13, 10, 17, 11, 50, 27, 35, 33, 37, 48, and 46 as shown in FIG. 6. The power of the supplementary reduction transmission (2) is transmitted in the same order as the supplementary speed change for the speed 1.

Forward Movement Speed 4.

Figure 7:
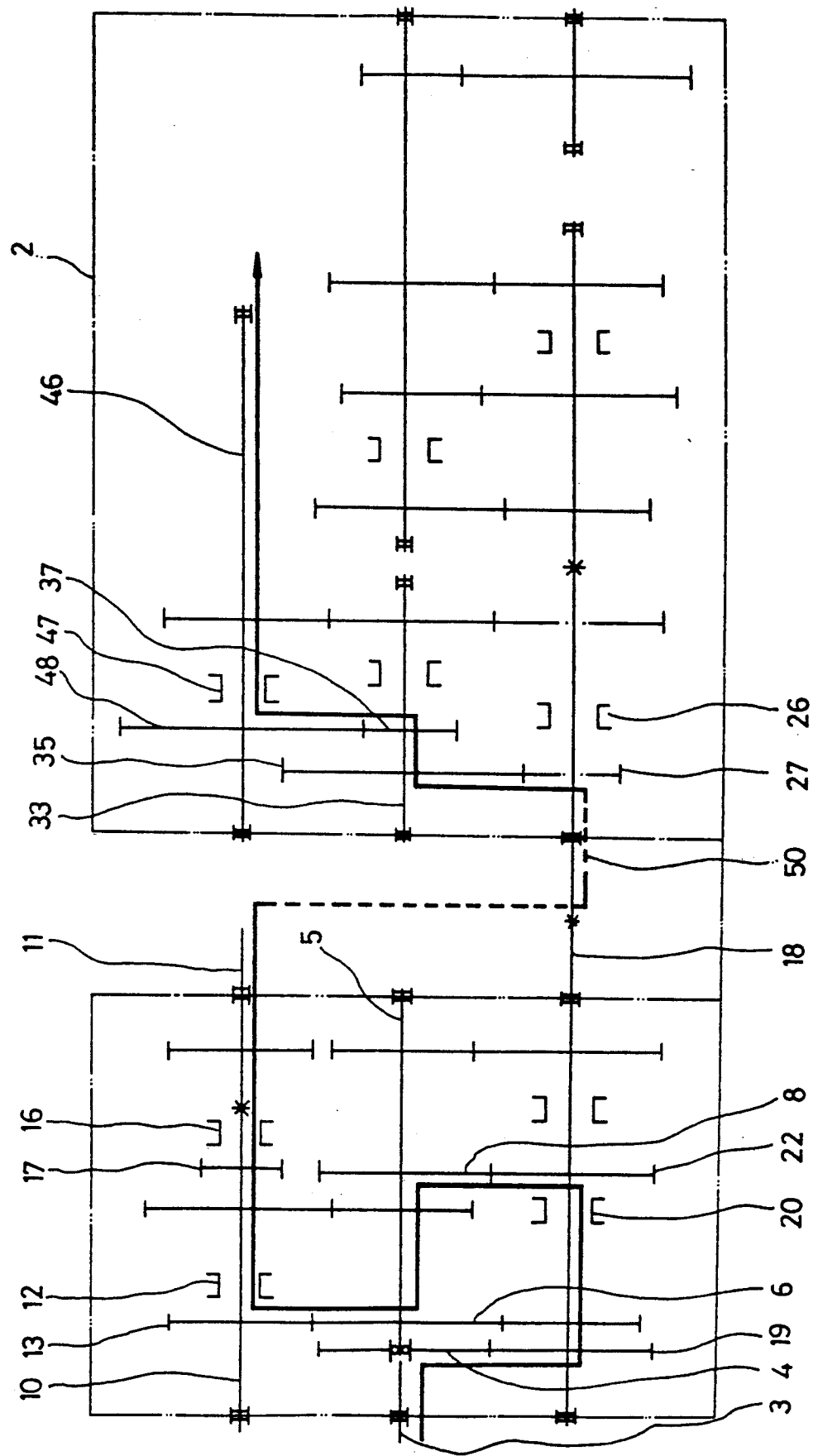

When the main speed changing lever is changed to the speed 4 position, the hub sleeve (20) and the hub sleeve (12) of main transmission (1) are engaged with the transmission gears (22)(13) respectively, the forward or backward movement choosing hub sleeve (16) is synchronously engaged with the transmission gear (17). The hub sleeves (26)(47) are engaged with the transmission gears (27)(48) and engine power is transmitted in the following order of elements 3, 4, 19, 18, 22, 8, 5, 6, 13, 10, 17, 11, 50, 27, 35, 33, 37, 48 and 46 as shown in FIG. 7. The power of the supplementary reduction transmission (2) is transmitted in the same order as the supplementary speed change for the speed 1.

Forward Movement Speed 5.

Figure 8:
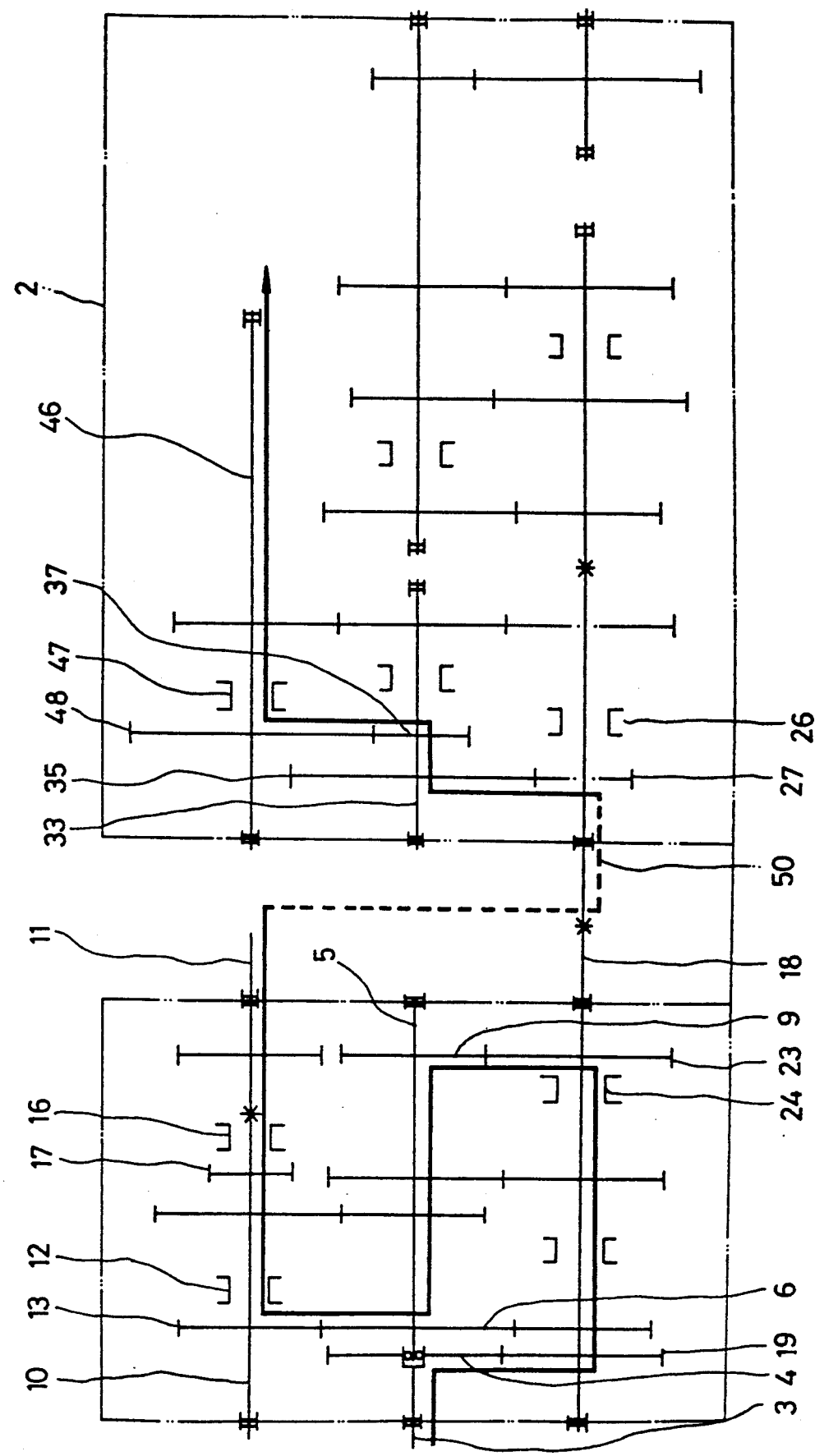

When the main speed changing lever is changed to the speed 5 position, the hub sleeves (12)(24) are engaged with the transmission gears (13)(23) respectively. The forward or backward movement choosing hub sleeve (16) is synchronously engaged with the transmission gear (17), the hub sleeves (26)(47) being engaged with the transmission gears (27)(48). The engine power is transmitted in the following order of elements 3, 4, 19, 18, 23, 9, 5, 6, 13, 10, 17, 11, 50, 27, 35, 33, 37, 48 and 46 as shown in FIG. 8. The power of the supplementary reduction transmission (2) is transmitted in the same order as the supplementary speed change for the speed 1.

Forward Movement Speed 6.

Figure 9:
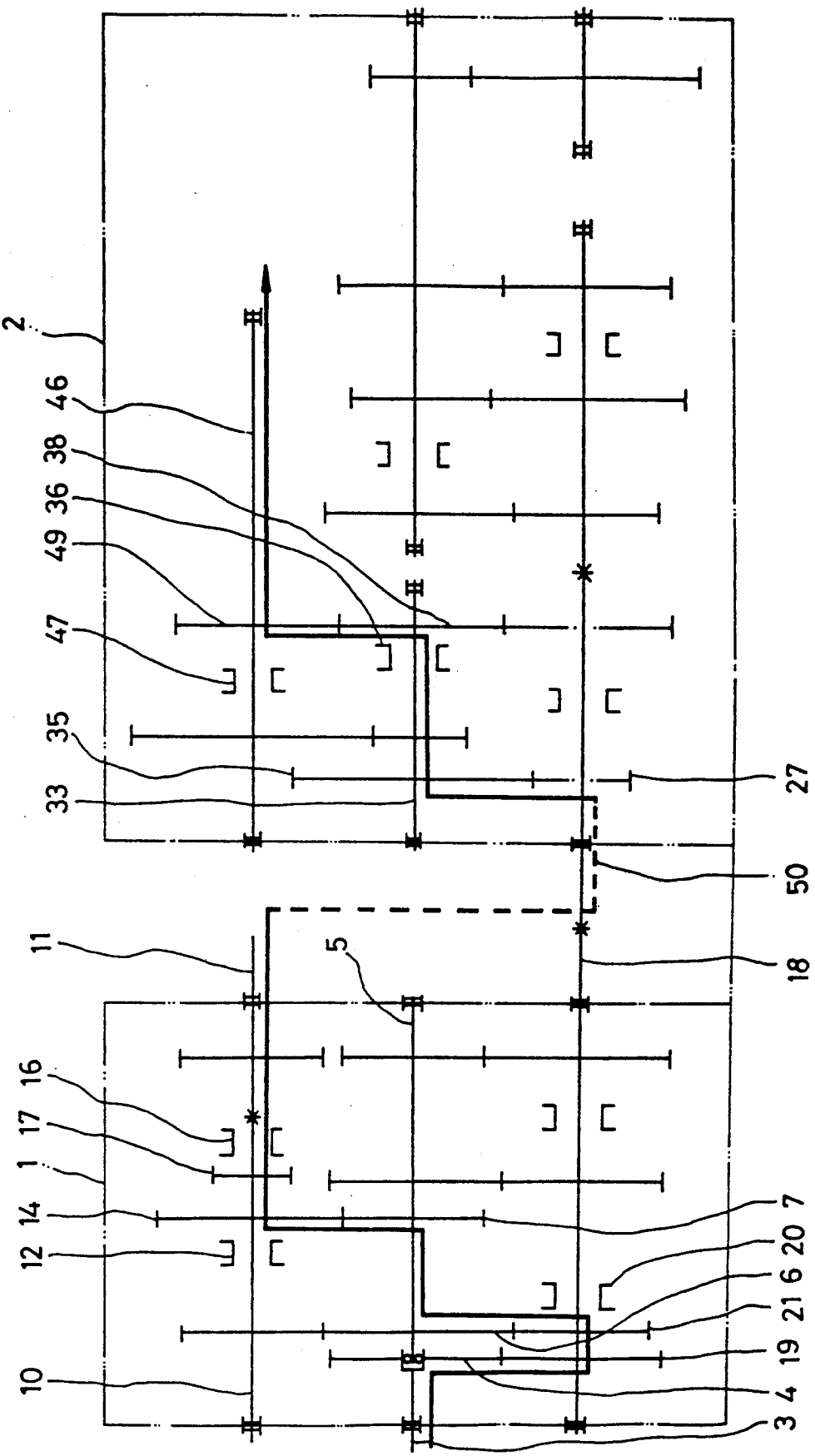

When the main speed changing lever is changed to the speed 1 position, the hub sleeve (20) and the hub sleeve (12) of main transmission (1) are respectively engaged with the transmission gear (17) and, when the supplementary speed changing lever is changed to the speed 2 position, the hub sleeve (36) of supplementary reduction transmission (2) is engaged with the transmission gear (38) and the engine power is transmitted in the following order of elements 3, 4, 19, 18, 21, 6, 5, 7, 14, 10, 17, 11, 50, 27, 35, 33, 38, 49 and 46 as shown in FIG. 9.

Forward Movement Speed 7.

Figure 10:
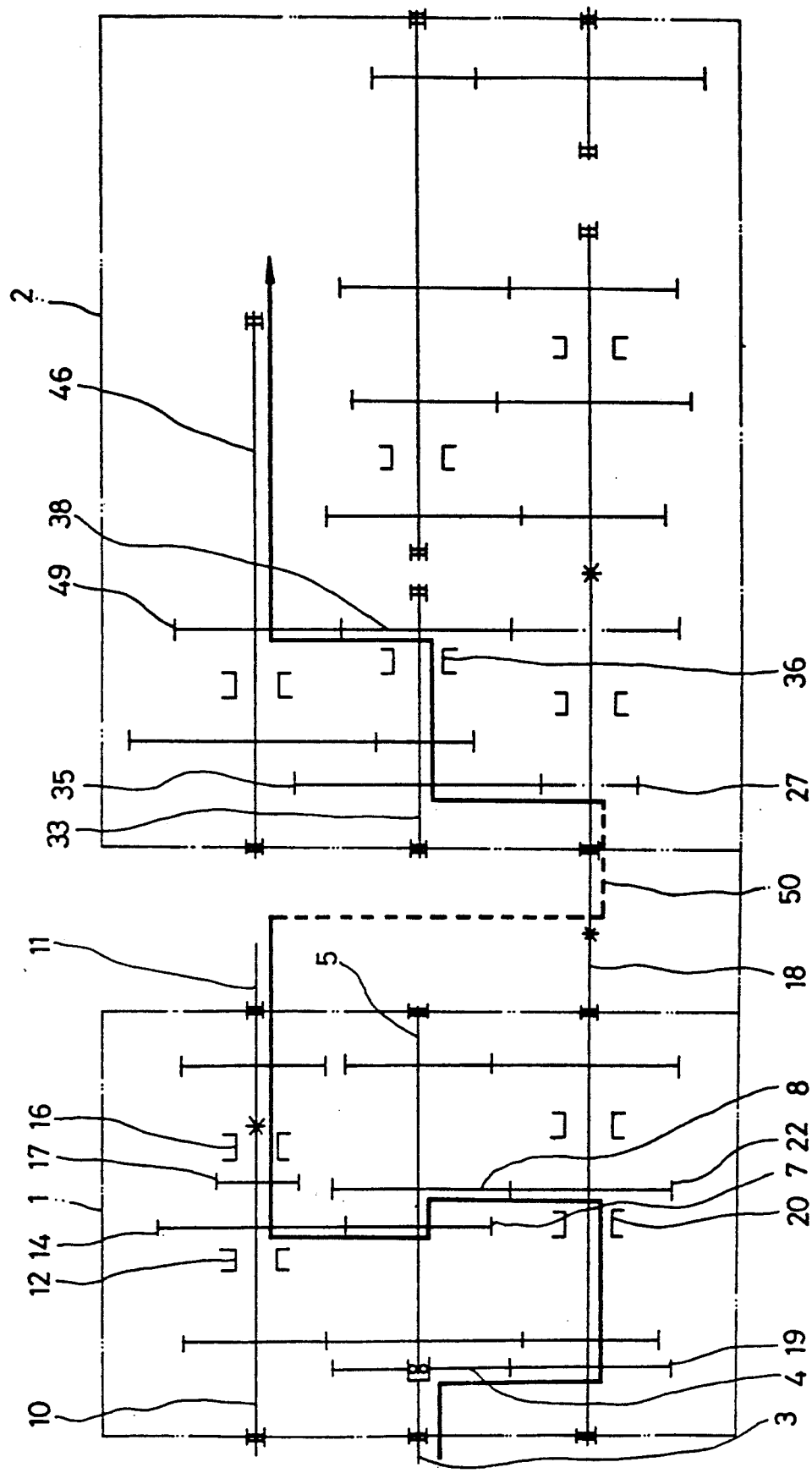

When the main speed changing lever is changed to the speed 2 position, the hub sleeve (20) and the hub sleeve (12) of the main transmission (1) are respectively engaged with the transmission gears (22)(14), the forward or backward movement selecting hub sleeve (16) is synchronously engaged with the transmission gear (17), the hub sleeve (36) being engaged with the transmission gear (38) and the engine power is transmitted in the following order of elements 3, 4, 19, 18, 22, 8, 5, 7, 14, 10, 17, 11, 50, 27, 35, 33, 38, 49 and 46 as shown in FIG. 10. The power of the supplementary reduction transmission (2) is transmitted in the same order as the supplementary speed change for the speed 6.

Forward Movement Speed 8.

Figure 11:
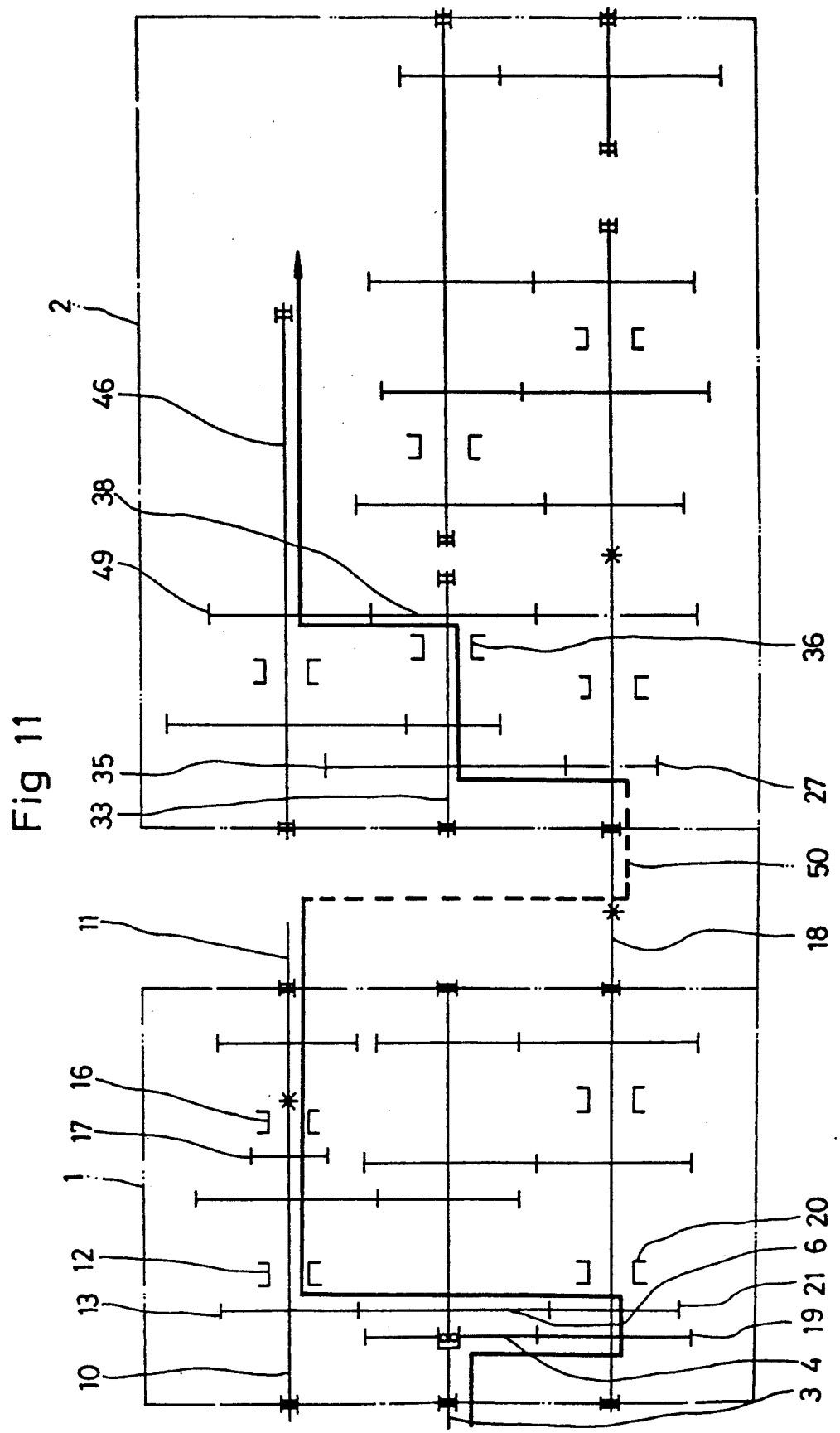

When the main speed changing lever is changed to the speed 3 position, the hub sleeve (20) and the hub sleeve (12) of the main transmission (1) are respectively engaged with the transmission gears (21)(3). The forward or backward movement selecting hub sleeve (16) is synchronously engaged with the transmission gear (17), the hub sleeve (36) being engaged with the transmission gear (38) and the engine power is transmitted in the following order of elements 3, 4, 19, 18, 21, 6, 13, 10, 17, 11, 50, 27, 35, 33, 38, 49 and 46 as shown in FIG. 11. The power of the supplementary reduction transmission (2) is transmitted in the same order as the supplementary speed change for the speed 6.

Forward Movement Speed 9.

Figure 12:
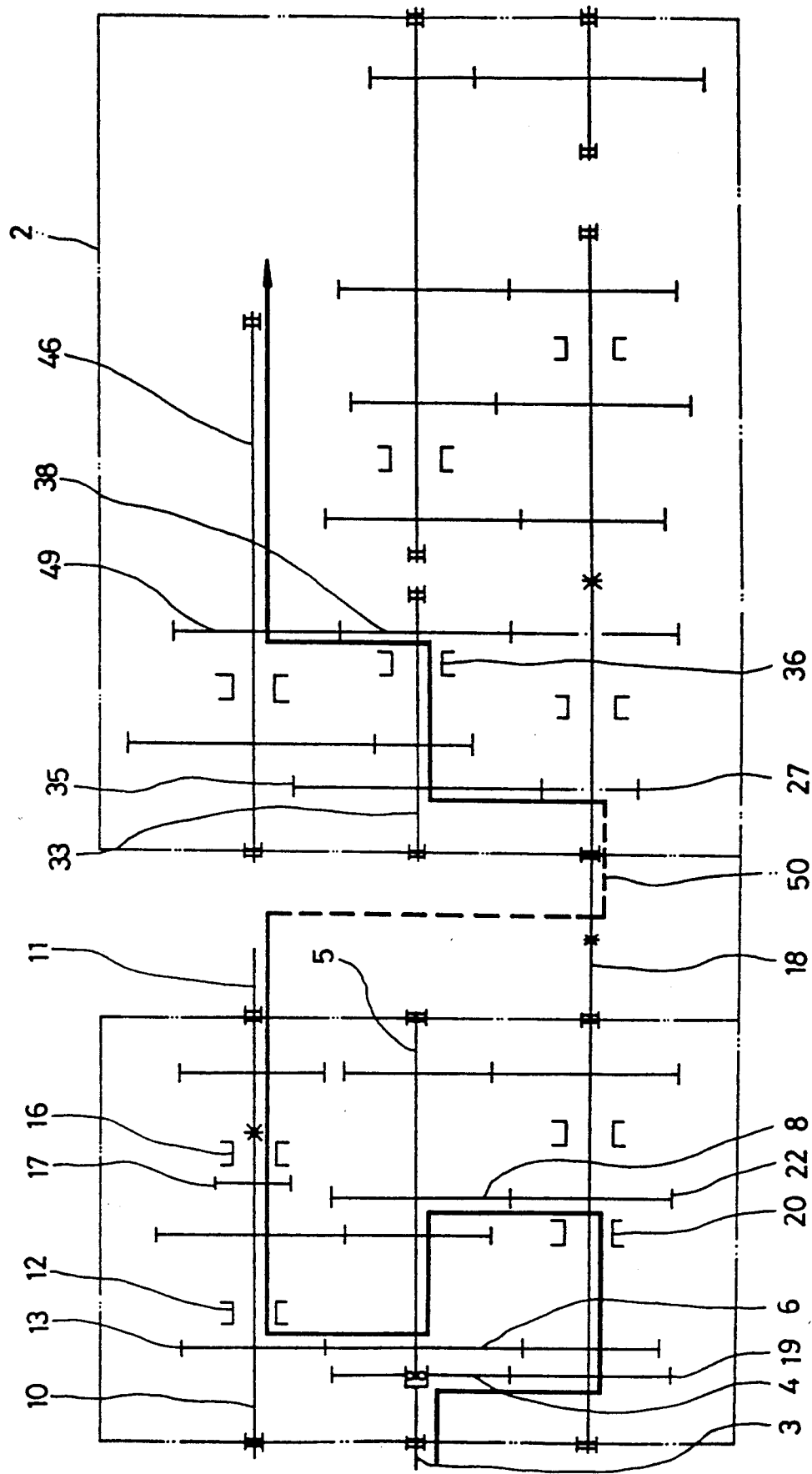

When the main speed changing lever is changed to the speed 4 position, the hub sleeve (20) and the hub sleeve (12) of the main transmission (1) are respectively engaged with the transmission gears (22)(13), the forward or backward movement selecting hub sleeve (16) is synchronously engaged with the transmission gear (17), the hub sleeve (36) being engaged with the transmission gear (38) and the engine power is transmitted in the following order of elements 3, 4, 19, 18, 22, 8, 5, 6, 13, 10, 17, 11, 50, 27, 35, 33, 38, 49 and 46 as shown in FIG. 12. The power of the supplementary reduction transmission (2) is transmitted in the same order as the supplementary speed change for the speed 6.

Forward Movement Speed 10.

Figure 13:
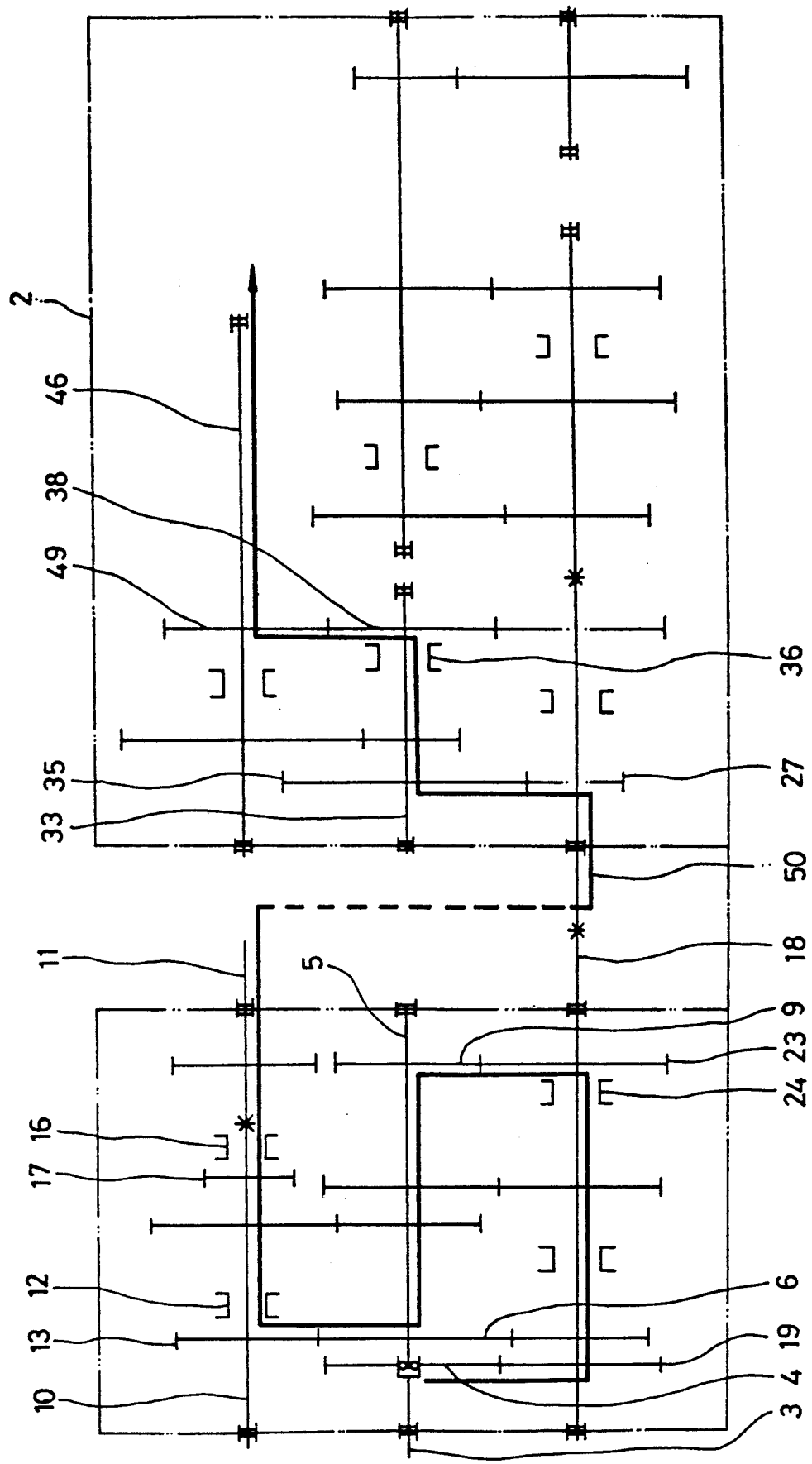

When the main speed changing lever is changed to the speed 5 position, the hub sleeves (12)(24) are engaged with the transmission gears (13)(23) respectively. The forward or backward movement selecting hub sleeve (16) is synchronously engaged with the transmission gear (17), the hub sleeve (36) being engaged with the transmission gear (38) and the engine power is transmitted in the following order of elements 3, 4, 19, 18, 23, 9, 5, 6, 13, 10, 17, 11, 50, 27, 35, 33, 38, 49 and 46 as shown in FIG. 13. The power of the supplementary reduction transmission (2) is transmitted in the same order as the supplementary speed change for the speed 6.

Forward Movement Speed 11.

Figure 14:
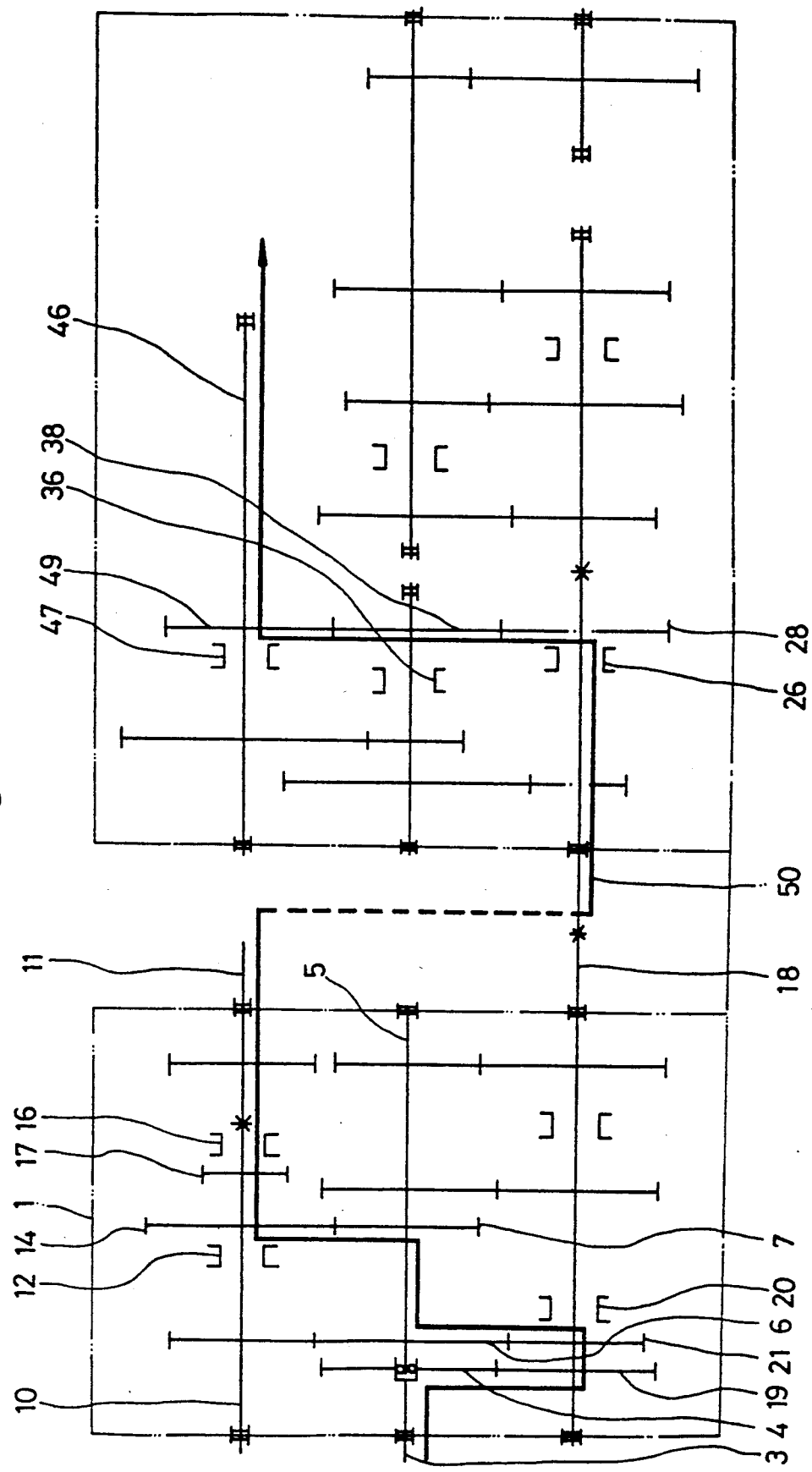

When the main speed changing lever is changed to the speed 1 position, the hub sleeve (20) and the hub sleeve (12) are engaged with the transmission gears (21)(14). the forward or backward movement selecting hub sleeve (16) is synchronously engaged with the transmission gear (17) and, when the supplementary speed changing lever is changed to the speed 3 position, the hub sleeves (26)(47) are respectively engaged with the transmission gears (28)(49) and the engine power is transmitted in the following order of elements of 3, 4, 19, 18, 21, 6, 5, 7, 14, 10, 17, 11, 50, 28, 38, 49 and 46 as shown in FIG. 14.

Forward Movement Speed 12.

Figure 15:
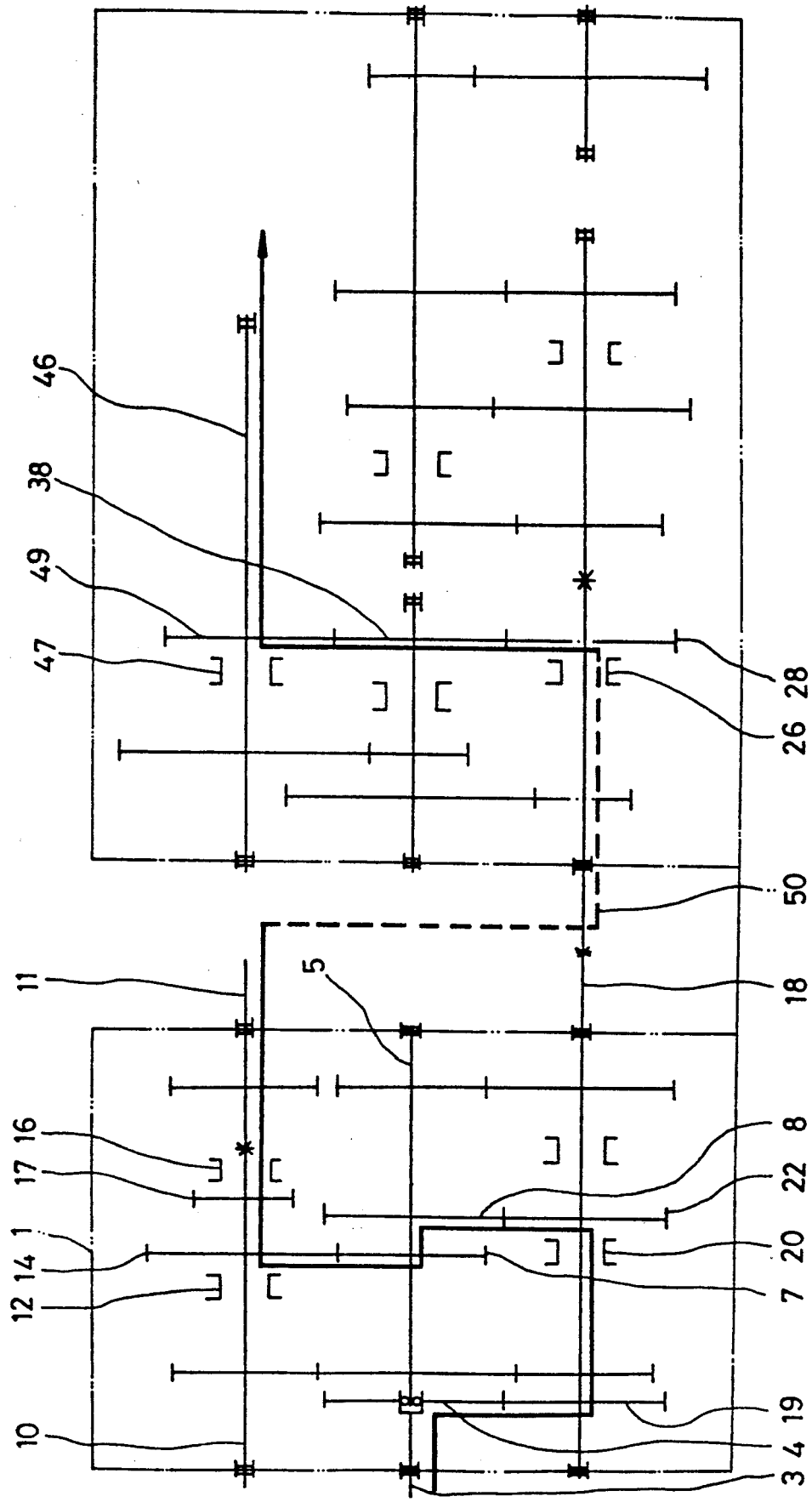

When the main speed changing lever is changed to the speed 2 position, the hub sleeve (20) and the hub sleeve (12) of the main transmission (1) are respectively engaged with the transmission gears (22)(14). the forward or backward movement selecting hub sleeve (16) is synchronously engaged with the transmission gear (17), the hub sleeves (26)(47) are engaged with the transmission gears (28)(49) and the engine power is transmitted in the following order of elements 3, 4, 19, 18, 22, 8, 5, 7, 14, 10, 17, 11, 50, 28, 38, 49 and 46 as shown in FIG. 15. The power of the supplementary reduction transmission (2) is transmitted in the same order as the supplementary speed change for the speed 11.

Forward Movement Speed 13

Figure 16:
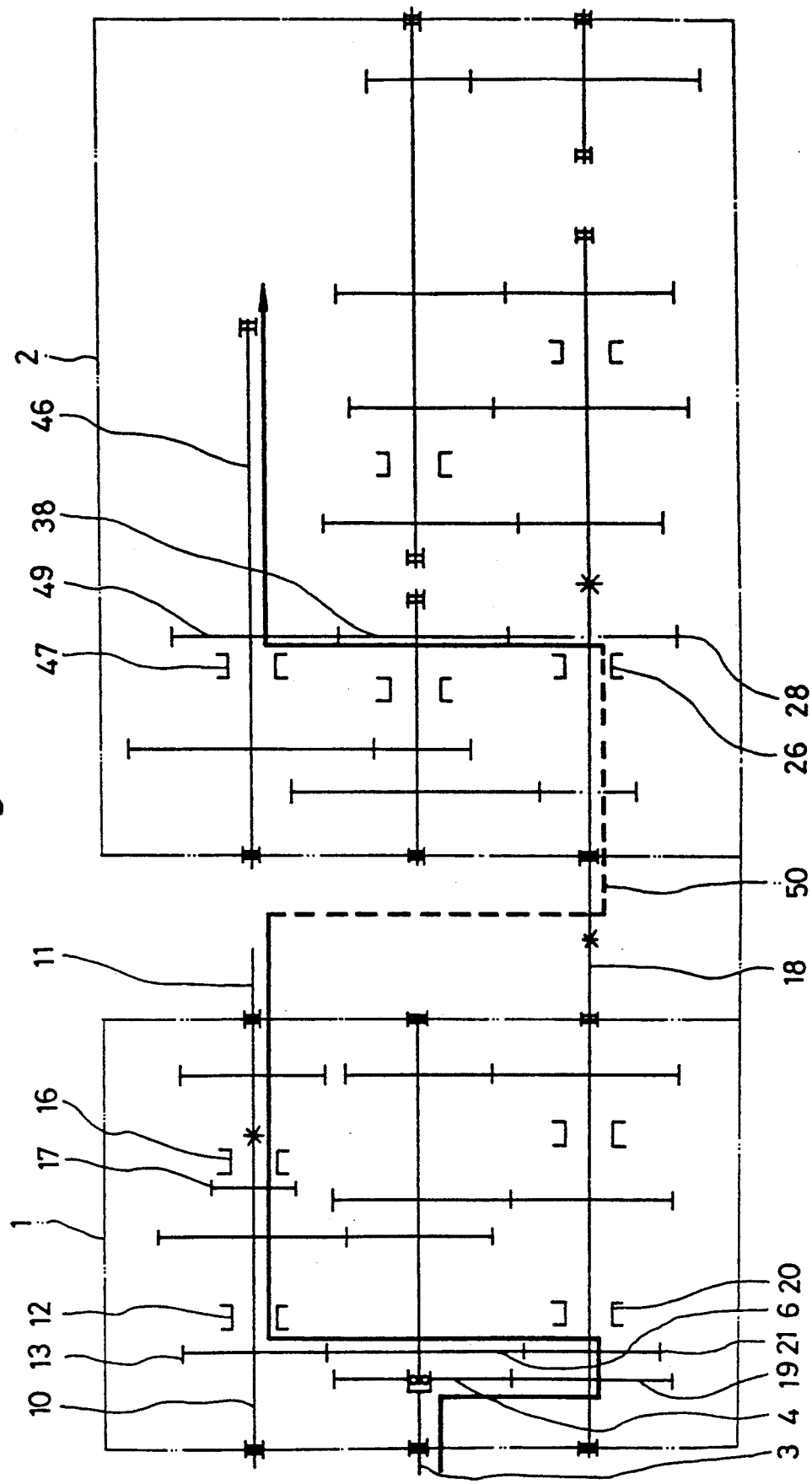

When the main speed changing level is changed to the speed 3 position, the hub sleeve (20) and the hub sleeve (12) of the main transmission (1) are respectively engaged with the transmission gears (21)(13). the forward or backward movement selecting hub sleeve (16) is synchronously engaged with the transmission gear (17), the hub sleeves (26) (47) being engaged with the transmission gears (28) (49) and the engine power is transmitted in the following order of elements 3, 4, 19, 18, 21, 6, 13, 10, 17, 11, 50, 28, 38, 49 and 46 as shown in FIG. 16. The power of the supplementary reduction transmission (2) is transmitted in the same order as the supplementary speed change for speed 11.

Forward Movement Speed 14.

Figure 17:
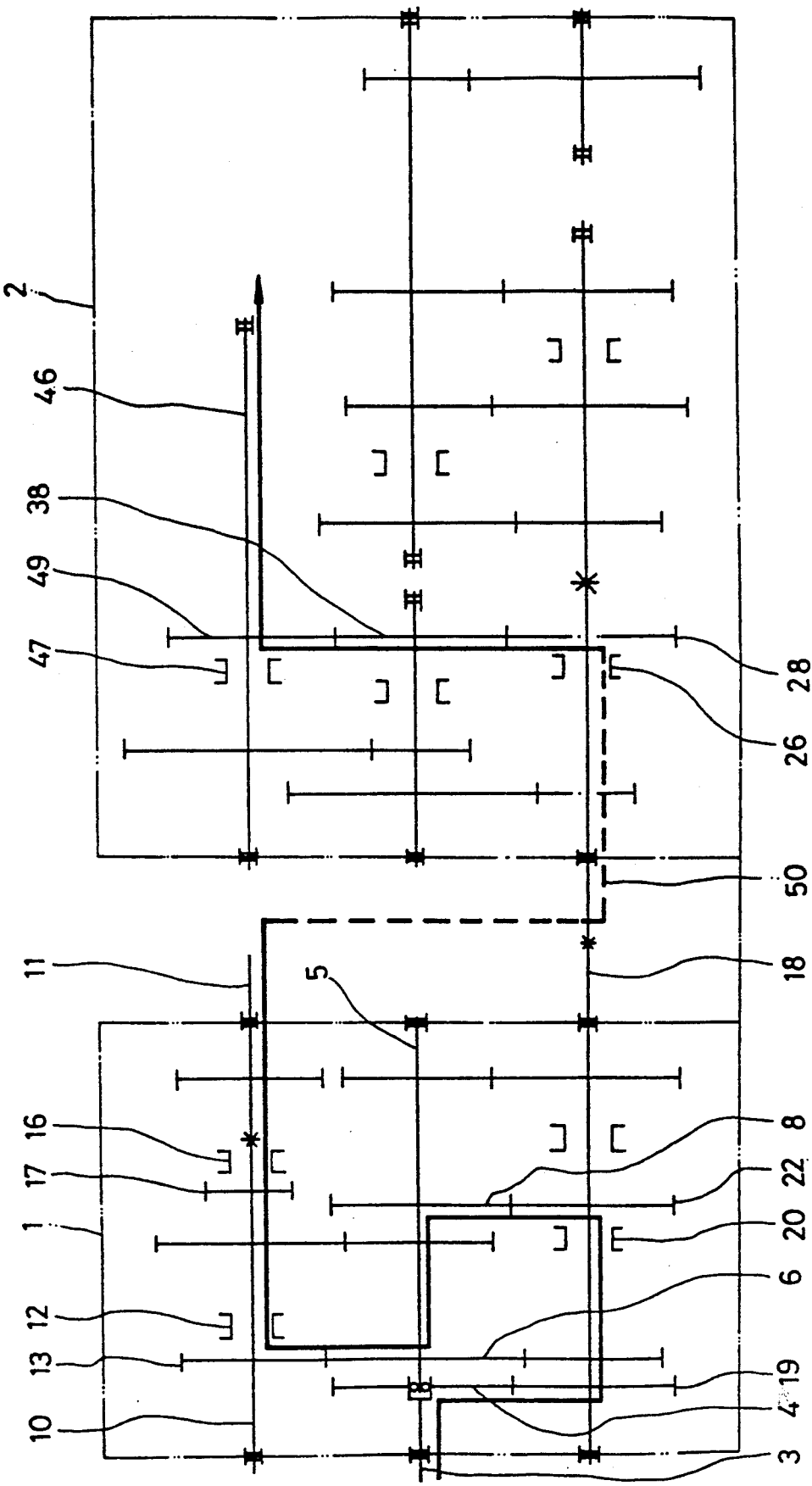

When the main speed changing lever is changed to the speed 4 position, the hub sleeve (20) and the hub sleeve (12) of the main transmission (1) are respectively engaged with the transmission gears (22)(13). the forward or backward movement selecting hub sleeve (16) is synchronously engaged with the transmission gear (17), the hub sleeves (26)(47) being engaged with the transmission gears (28)(49) and the engine power is transmitted in the following order of elements 3, 4, 19, 18, 22, 8, 5, 6, 13, 10, 17, 11, 50, 28, 38, 49 and 46 as shown in FIG. 17. The power of the supplementary reduction transmission (2) is transmitted in the same order as the supplementary speed change of said speed 11.

Forward Movement Speed 15.

Figure 18:
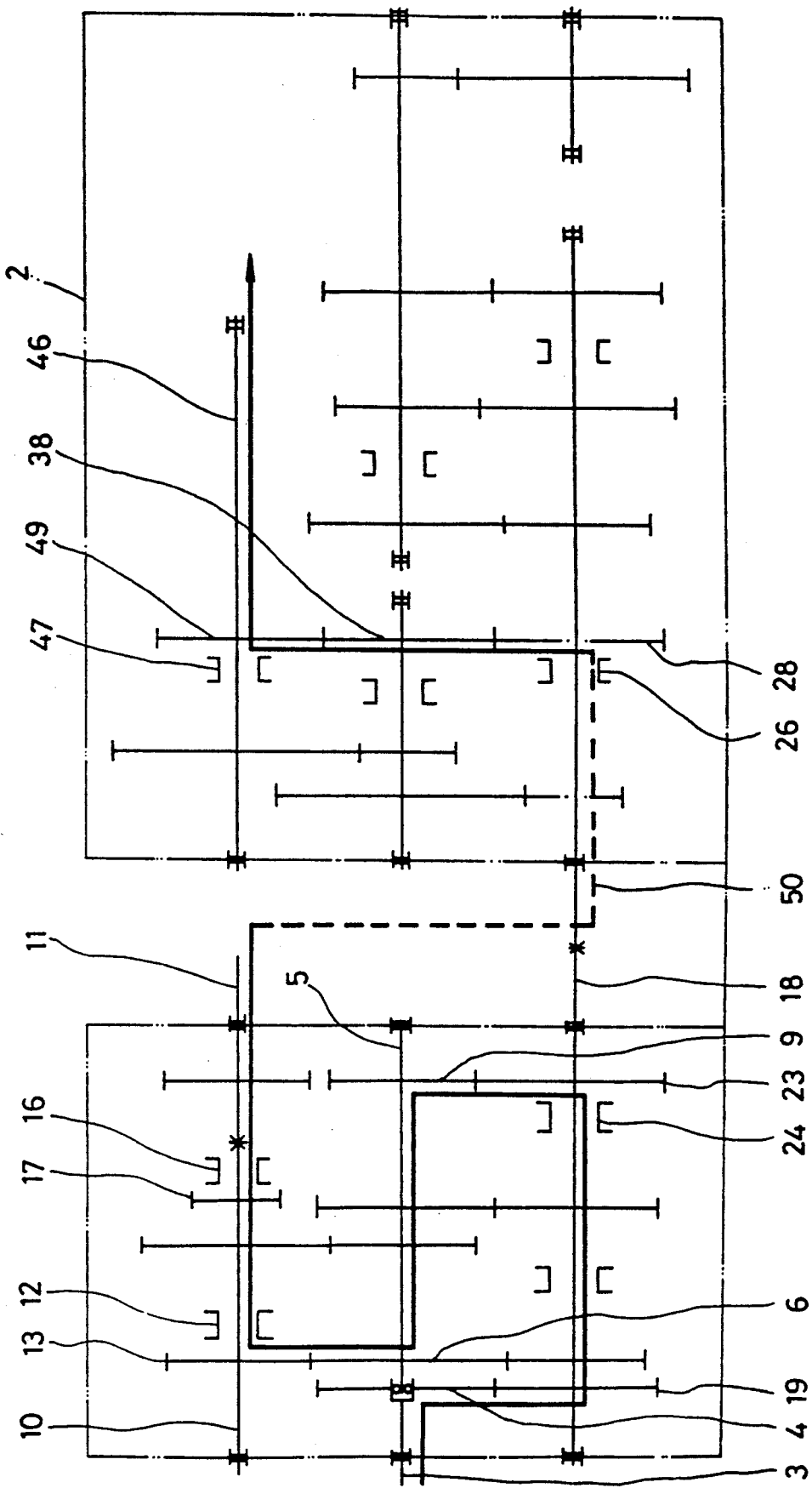

When the main speed changing lever is changed to the speed 5 position, hub sleeves (12)(24) are respectively engaged with the transmission gears (13)(23). the forward or backward movement selecting hub sleeve (16) is synchronously engaged with the transmission gear (17), the hub sleeves (26)(47) being engaged with the trasmission gears (28)(49) and the engine power is transmitted in the following order of elements 3, 4, 19, 18, 23, 9, 5, 6, 13, 10, 17, 11, 50, 28, 38, 49 and 46 as shown in FIG. 18. The power of the supplementary reduction transmission (2) is transmitted in the same order as the supplementary speed change for the speed 11.

Backward Movement Speed 1.

Figure 19:
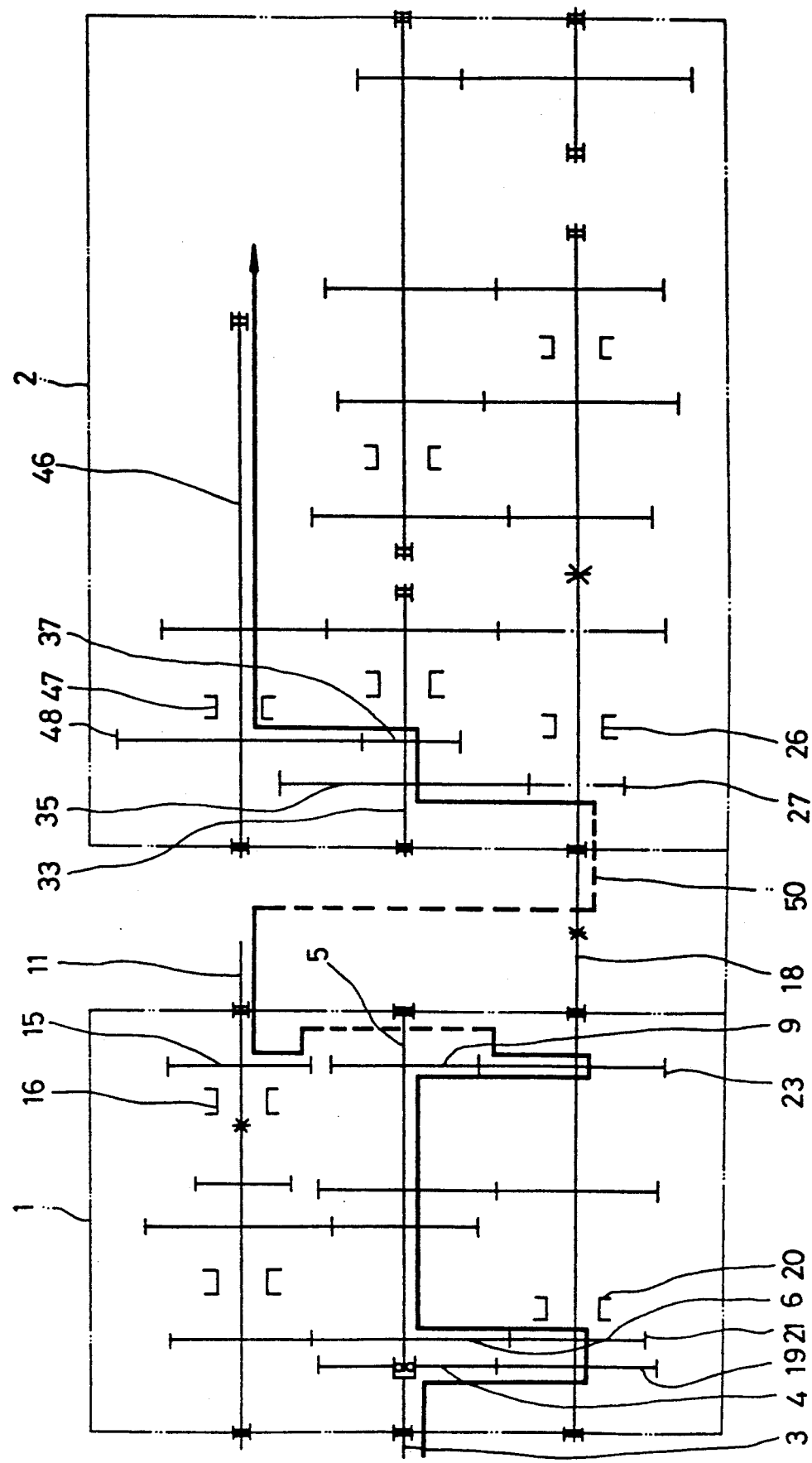

When the main speed changing lever is placed at the speed 1 position, after the speed changing lever for changing of forward or backward movement is changed to the backward movement position, the hub sleeve (20) and the forward or backward movement selecting hub sleeve (16) of main transmission (1) are respectively engaged with the transmission gears (21)(15), the hub sleeves (26)(47) are engaged with the transmission gears (27)(48) and the engine power is transmitted in the following order of elements 3, 4, 19, 18, 21, 6, 5, 9, 23, 15, 11, 50, 27, 35, 33, 37, 48 and 46 as shown in FIG. 19. At this time, backward movement is made possible by the operation of a reversing transmission gear (15). The power of the supplementary reduction transmission (2) is transmitted in the same order as the supplementary speed change of the forward movement speed 1.

Backward Movement Speed 2.

Figure 20:
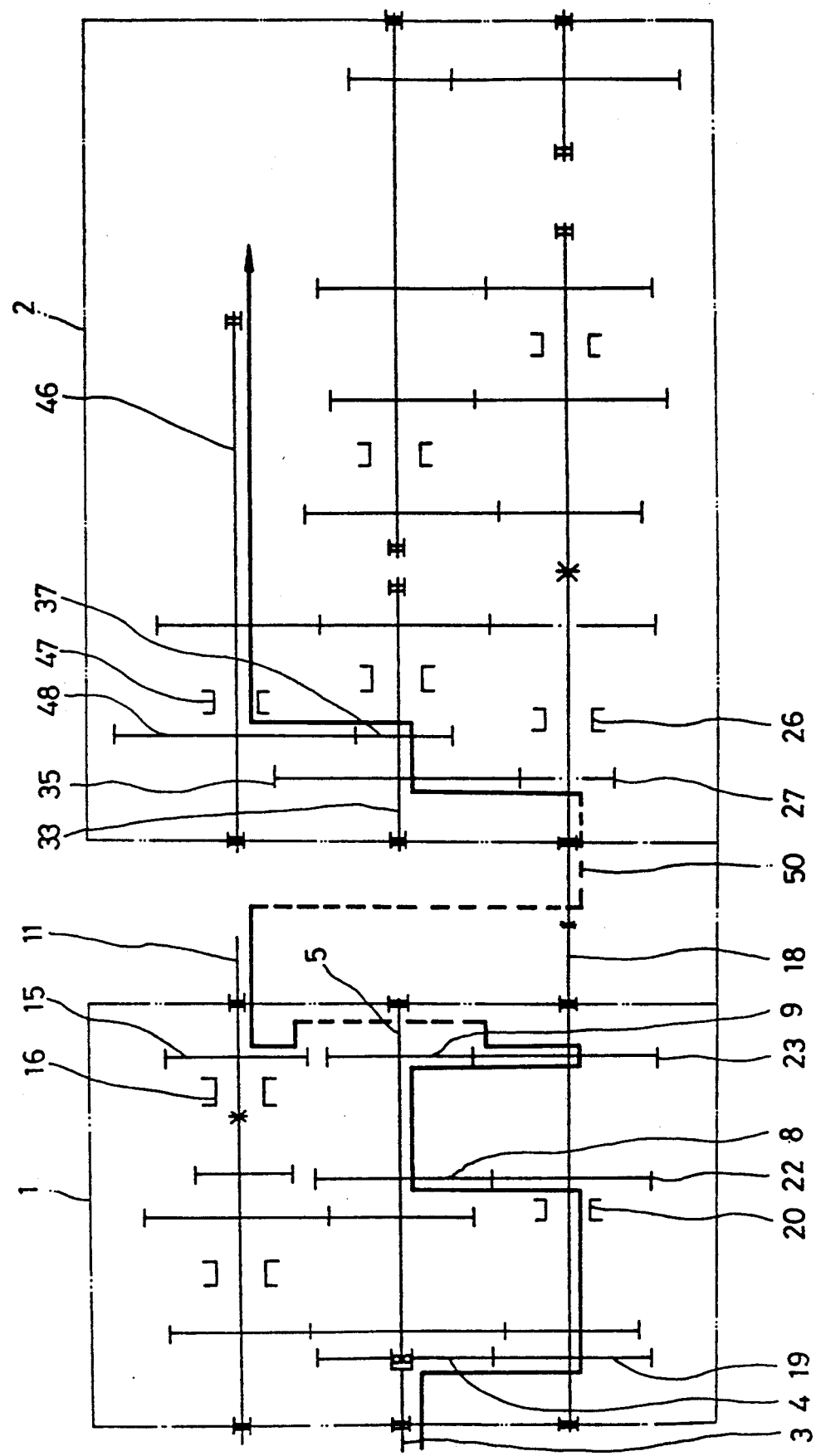

When the main speed changing lever is changed to the speed 2 position at said backward movement speed 1 condition, the hub sleeve (20) and forward or backward movement selecting hub sleeve (16) of the main transmission (1) are respectively engaged with the transmission gears (22)(15). The hub sleeves (26)(47) are engaged with the transmission gears (27)(48) and the engine power is transmitted in the following order of elements 3, 4, 19, 18, 22, 8, 5, 9, 23, 15, 11, 50, 27, 35, 33, 37, 48 and 46 as shown in FIG. 20. The power of the supplementary reduction transmission (2) is transmitted in the same order as the supplementary speed change of the forward movement speed 1.

Backward Movement Speed 3.

Figure 21:
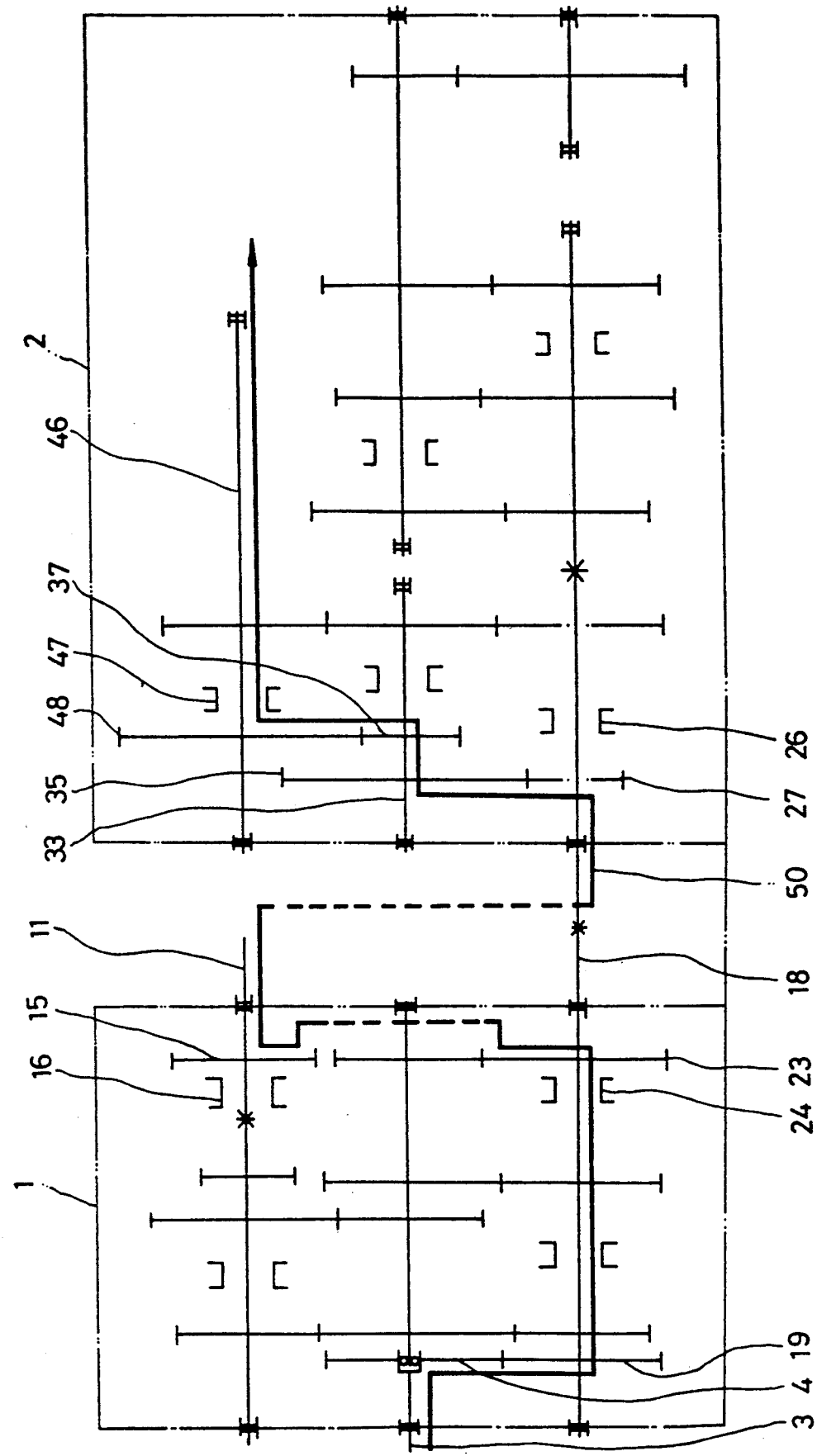

When the main speed changing lever is changed to the speed 3 position at the backward movement position, the hub sleeve (24) and the forward or backward movement selecting hub sleeve (16) of the main transmission (1) are engaged with the transmission gears (23)(15). The hub sleeves (26)(47) are engaged with the transmission gears (27)(48) and the engine power is transmitted in the following order of elements of 3, 4, 19, 18, 23, 15, 11, 50, 27, 35, 33, 37, 48 and 46 as shown in FIG. 21. The power of the supplementary reduction transmission (2) is transmitted in the same order as the supplementary speed change of the forward movement speed 1.

Backward Movement Speed 4.

Figure 22:
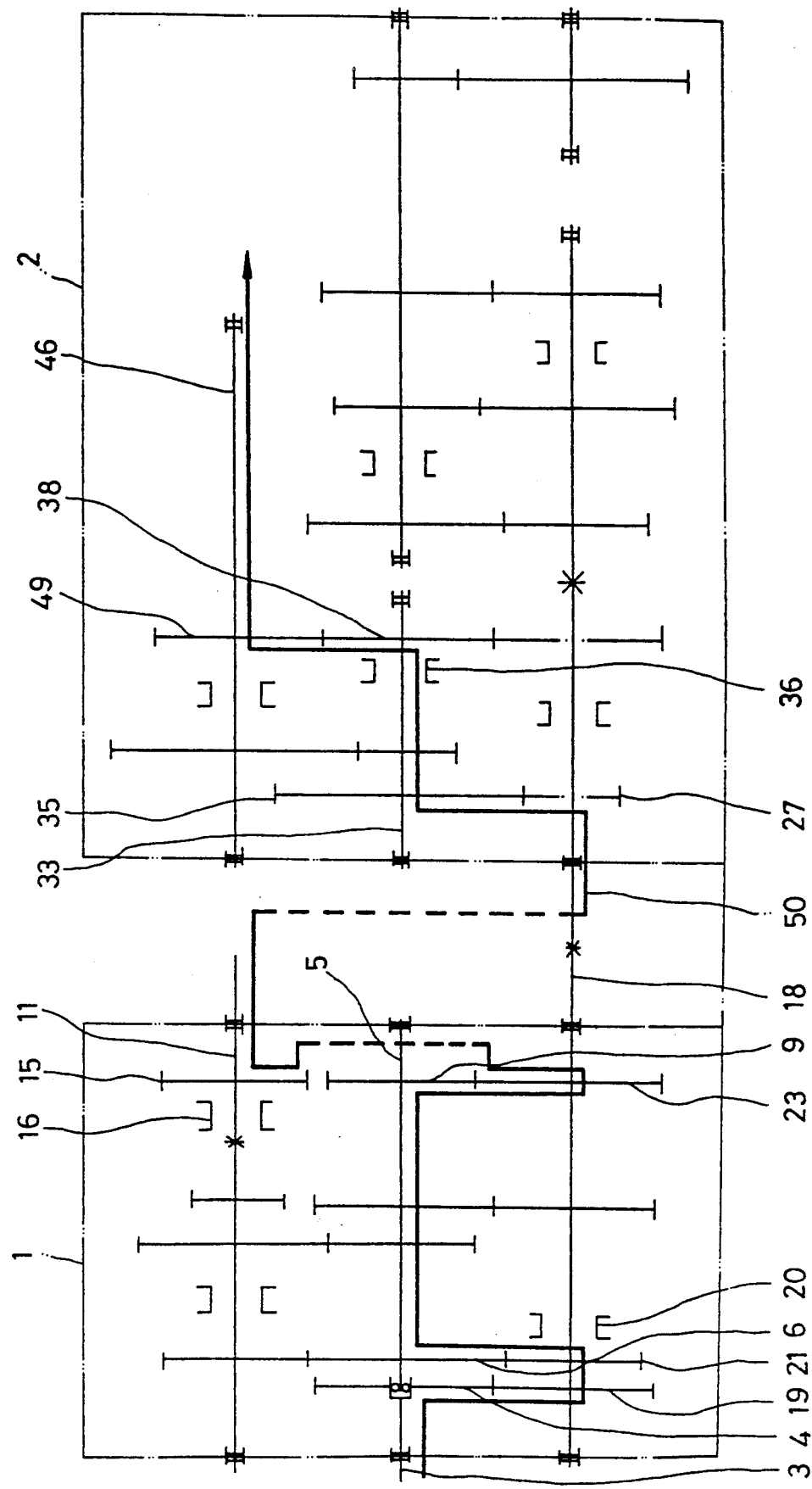

When the main speed changing is changed to the backward movement speed 1 position at the backward movement position, the hub sleeve (20) and the forward or backward movement selecting hub sleeve (16) of main transmission (1) are respectively engaged with the transmission gears (21)(15). The hub sleeve (36) is engaged with the transmission gear (38) and the engine power is transmitted in the following order of elements 3, 4, 19, 18, 21, 6, 5, 9, 23, 15, 11, 50, 27, 35, 33, 38, 49 and 46 as shown in FIG. 22. The power of the supplementary reduction transmission (2) is transmitted in the same order as the supplementary speed change of the forward movement speed 6.

Backward Movement Speed 5.

Figure 23:
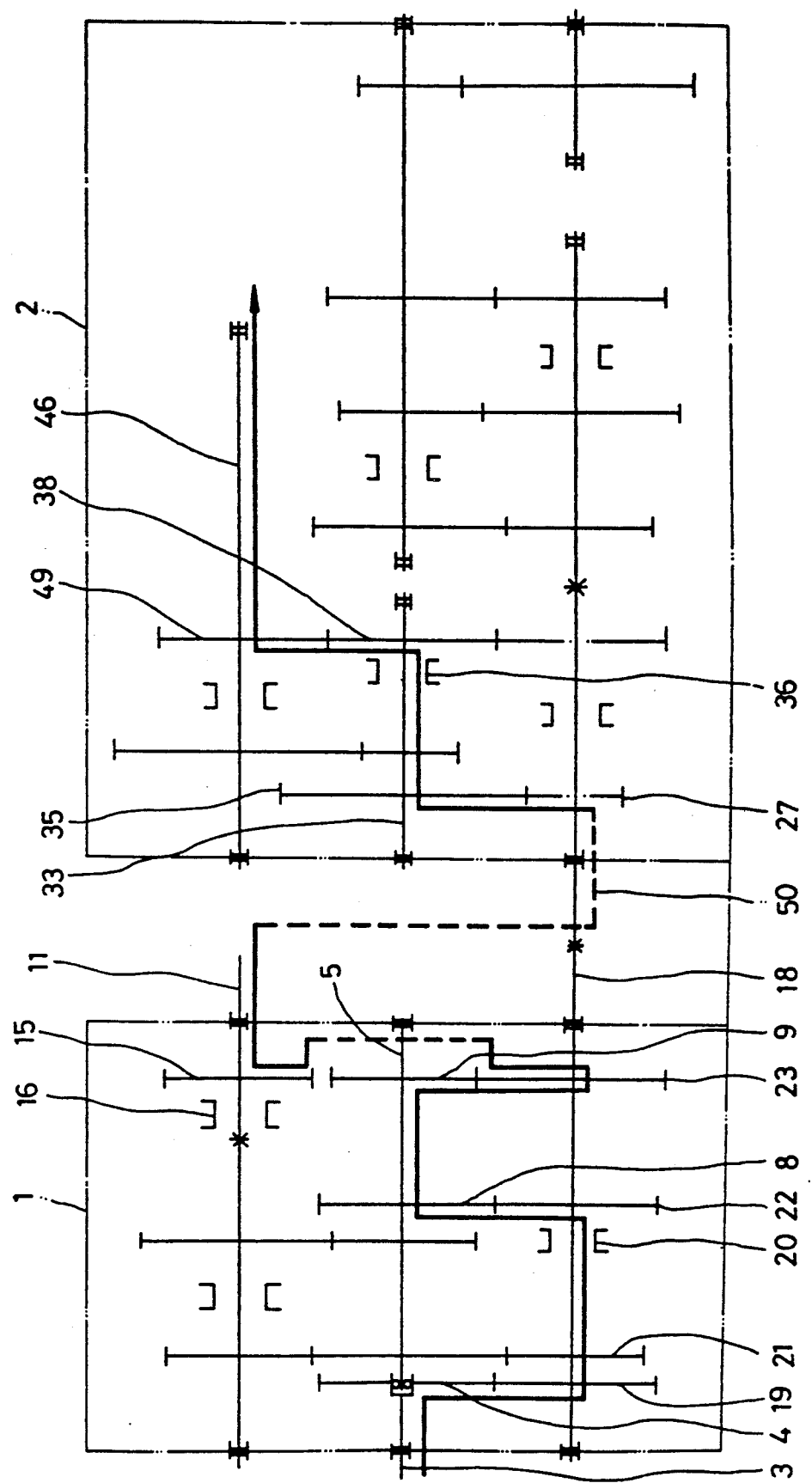

When the main speed changing lever is changed to the backward movement speed 2 position, the hub sleeve (20) and the forward or backward movement selecting hub sleeve (16) of the main transmission (1) are respectively engaged with the transmission gears (22)(15). The hub sleeve (36) is engaged with the transmission gear (38) and the engine power is transmitted in the following order of elements 3, 4, 19, 18, 22, 8, 5, 9, 23, 15, 11, 50, 27, 35, 33, 38, 49 and 46 as shown in FIG. 23. The power of the supplementary reduction transmission (2) is transmitted in the same order as the supplementary speed change of the forward movement speed 6.

Backward Movement Speed 6.

Figure 24:
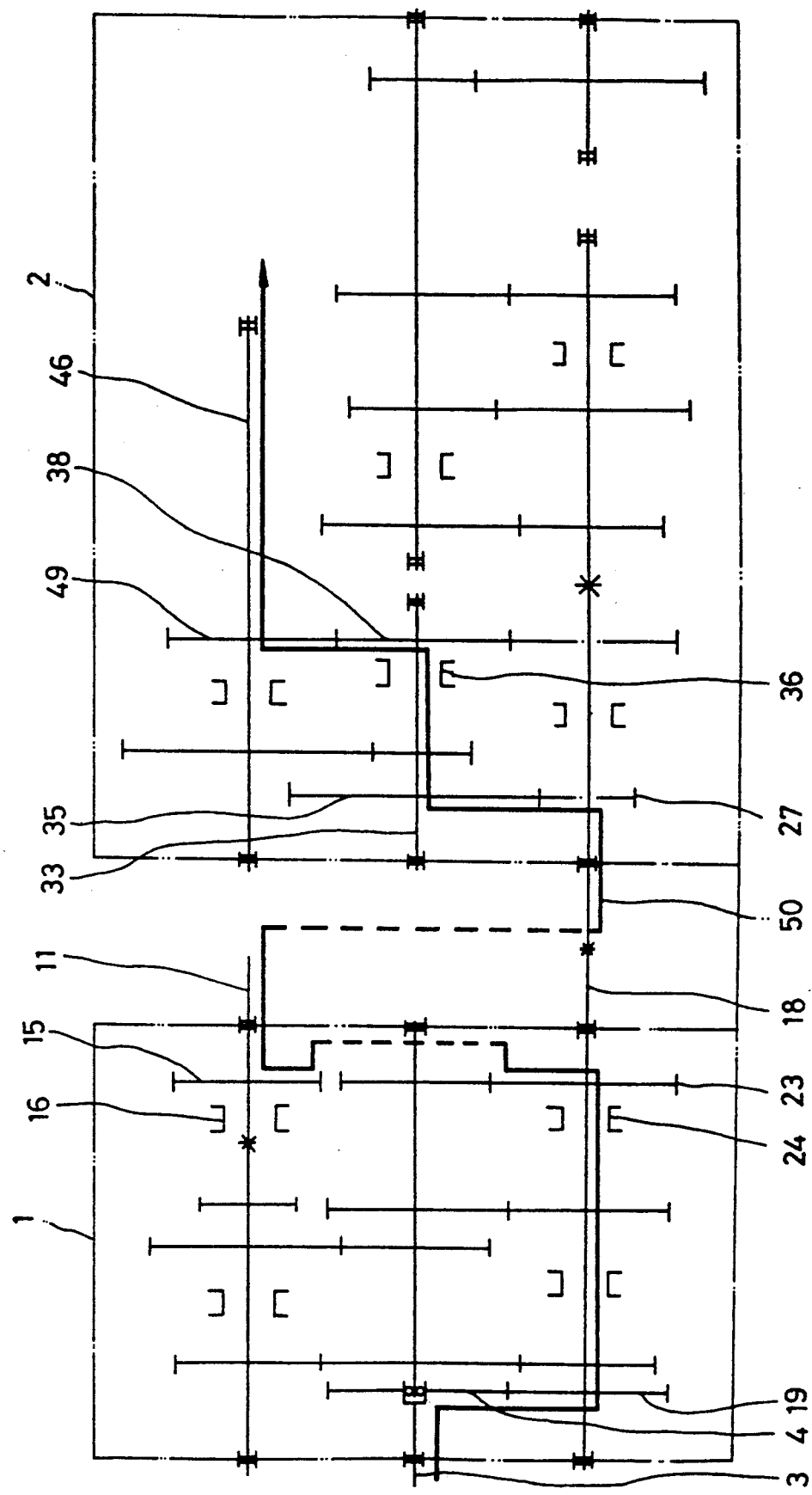

When the main speed changing lever is changed to the backward movement speed 3 position, the hub sleeve (24) and the forward or backward movement selecting hub sleeve (16) of main transmission (1) are engaged with the transmission gears (23)(15). The hub sleeve (36) is engaged with the transmission gear (38) and the engine power is transmitted in the following order of elements 3, 4, 19, 18, 23, 15, 11, 50, 27, 35, 33, 38, 49 and 46 as shown in FIG. 24. The power of the supplementary reduction transmission (2) is transmitted in the same order as the supplementary speed change of the forward movement speed 6.

Backward Movement Speed 7.

Figure 25:
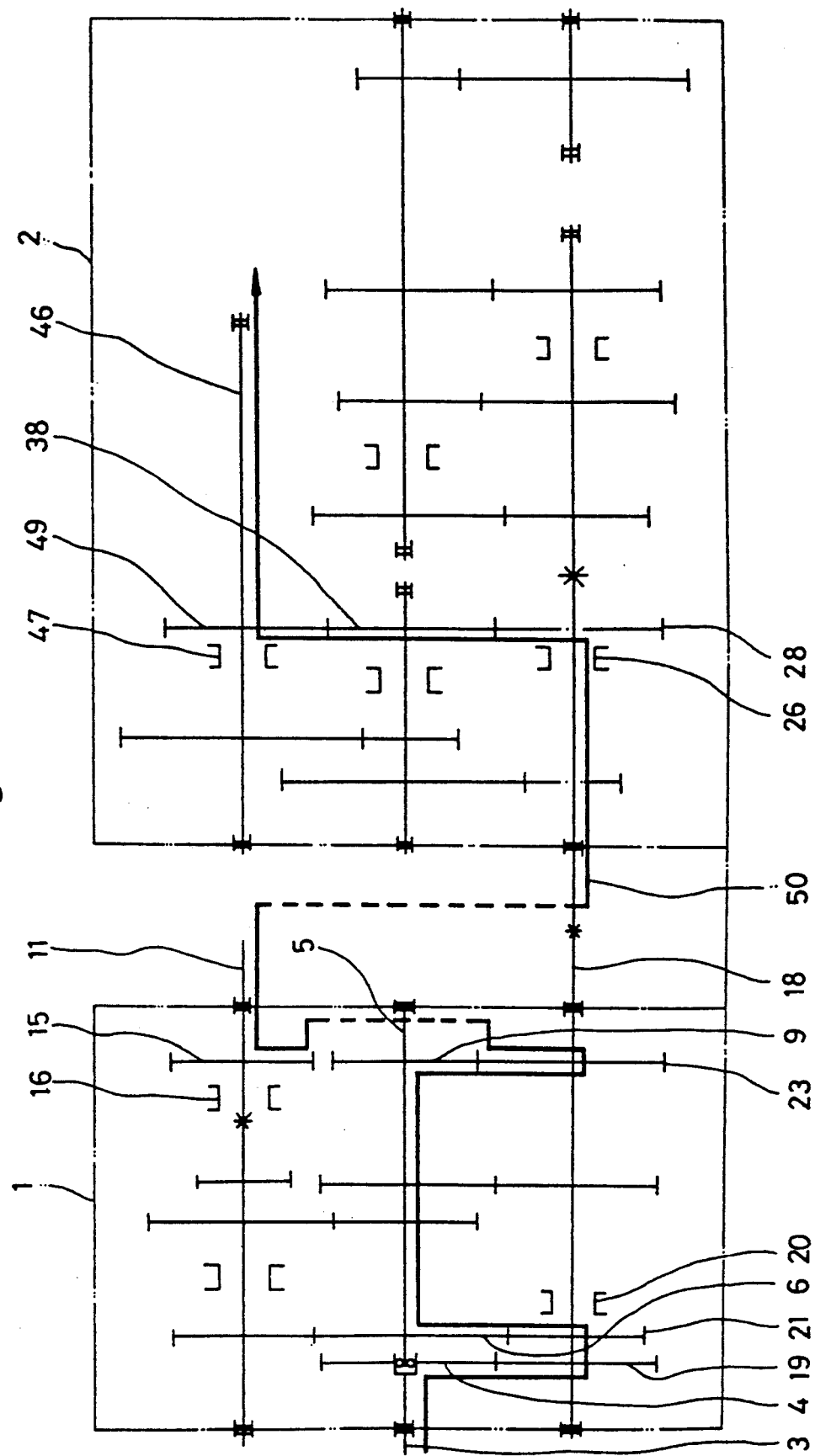

When the main speed changing lever is changd to the backward movement speed 1 position, the hub sleeve (20) and forward or backward movement selecting hub sleeve (16) of the main transmission (1) are respectively engaged with the transmission gear (21)(15). The hub sleeves (26)(47) are engaged with the transmission gears (28)(49) and the engine power is transmitted in the following order of elements 3, 4, 19, 18, 21, 6, 5, 9, 23, 15, 11, 50, 28, 38, 49 and 46 as shown in FIG. 25. The power of the supplementary reduction transmission (2) is transmitted in the same order as the supplementary speed change of the forward movement speed 11.

Backward Movement Speed 8.

Figure 26:
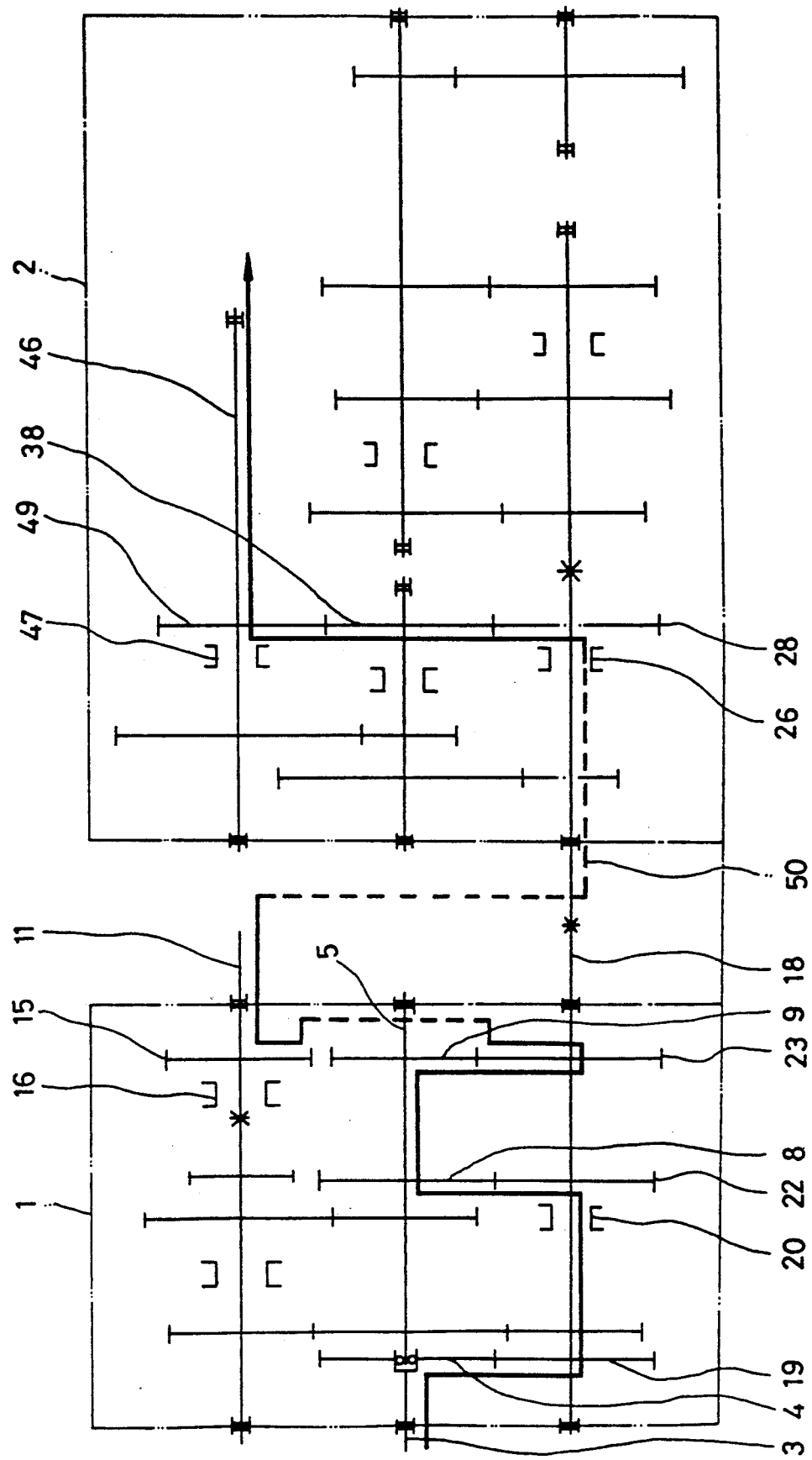

When the main speed changing lever is changed to the backward movement speed 2 position, the hub sleeve (20) and the forward or backward movement selecting hub sleeve (16) of the main transmission (1) are engaged with the transmission gears (22)(15). The hub sleeves (26)(47) are engaged with the transmission gears (28)(49) and the following engine power is transmitted in order of elements 3, 4, 19, 18, 22, 8, 5, 9, 23, 15, 11, 50, 28, 38, 49 and 46 as shown in FIG. 26. The power of the supplementary reduction transmission (2) is transmitted in the same order as the supplementary speed change of the forward movement speed 11.

Backward Movement Speed 9.

Figure 27:
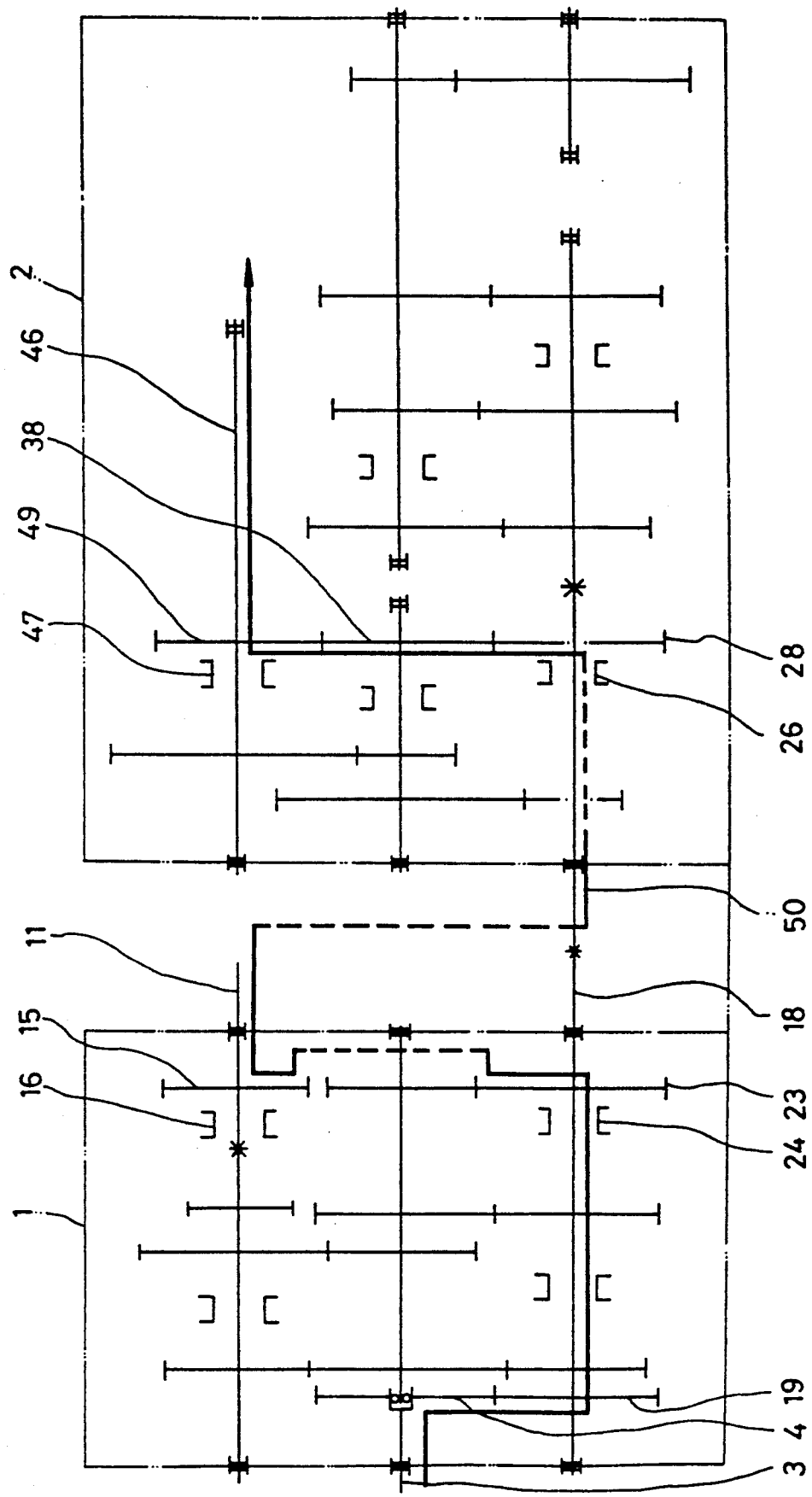

When the main speed changing lever is changed to the backward movement speed 3 position, the hub sleeve (24) and the forward or backward movement selecting hub sleeve (16) of the main transmission (1) are engaged with the transmission gears (23)(15). The hub sleeves (26)(47) are engaged with the transmission (28)(49) and the following engine power is transmitted in order of elements 3, 4, 19, 18, 23, 15, 11, 50, 28, 38, 49 and 46 as shown in FIG. 27. The power of the supplementary reduction transmission (2) is transmitted in the same order as the supplementary speed change of the forward movement speed 11.

PTO Speed 1.

Figure 28:
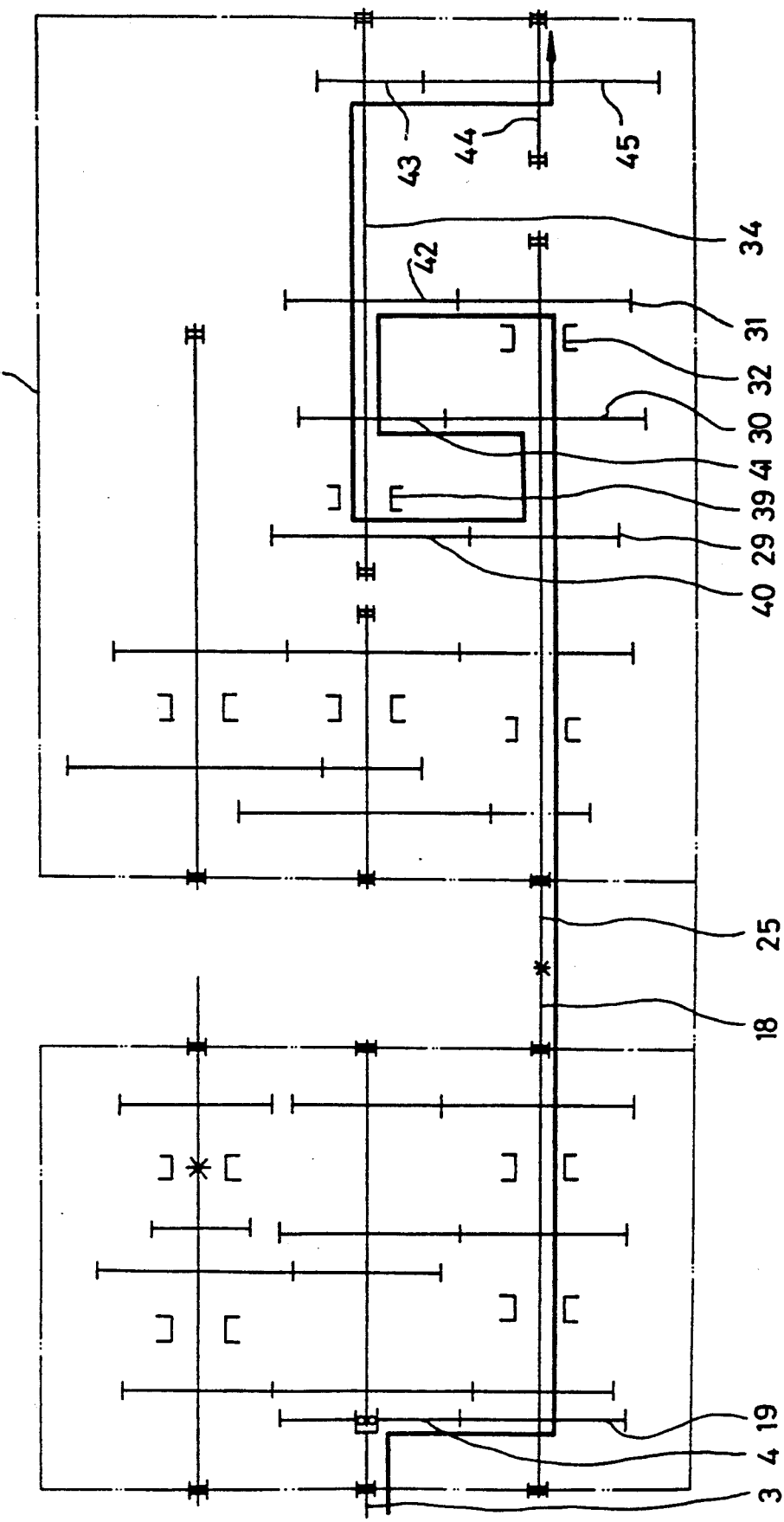

When one intends to generate a PTO output for PTO operation, if a PTO speed changing lever (not illustrated) is changed to the speed 1 position, the hub sleeves (32)(39) of the supplementary reduction transmission (2) are engaged with the transmission gears (31)(40) and the engine power is transmitted in the following order of elements 3, 4, 19, 18, 25, 31, 42, 41, 30, 29, 40, 34, 43 45 and 44 and the PTO output is thereby drawn as shown in FIG. 28.

PTO Speed 2.

Figure 29:
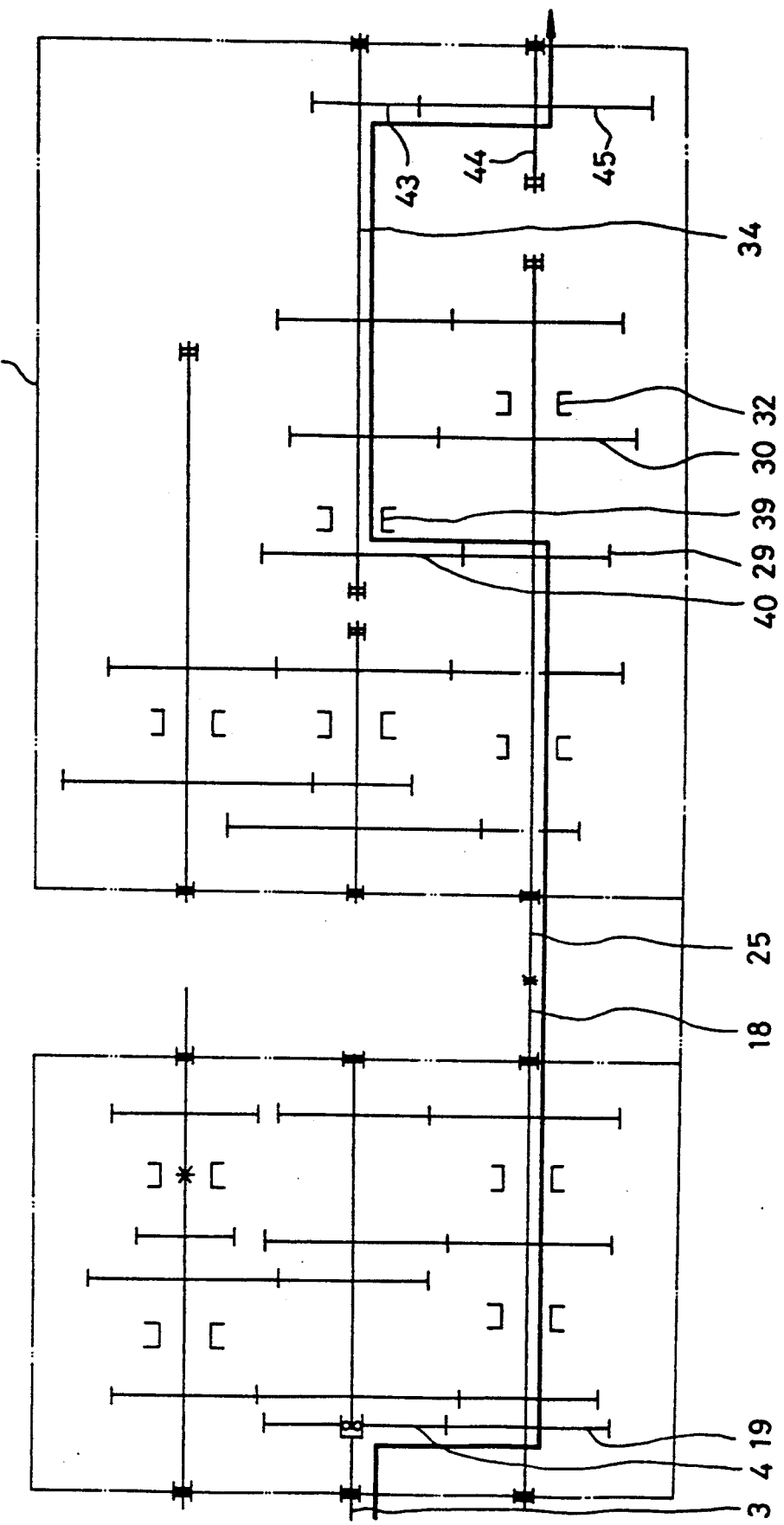

When a PTO speed changing lever is changed to the speed 2 position, the hub sleeves (32)(39) of the supplementary reduction transmission (2) are engaged with the transmission gears (30)(40) and the engine power is transmitted in the following order of elements 3, 4, 19, 18, 25, 29, 40, 34, 43, 45 and 44 and the PTO output is thereby generated as shown in FIG. 29.

PTO Speed 3.

Figure 30:
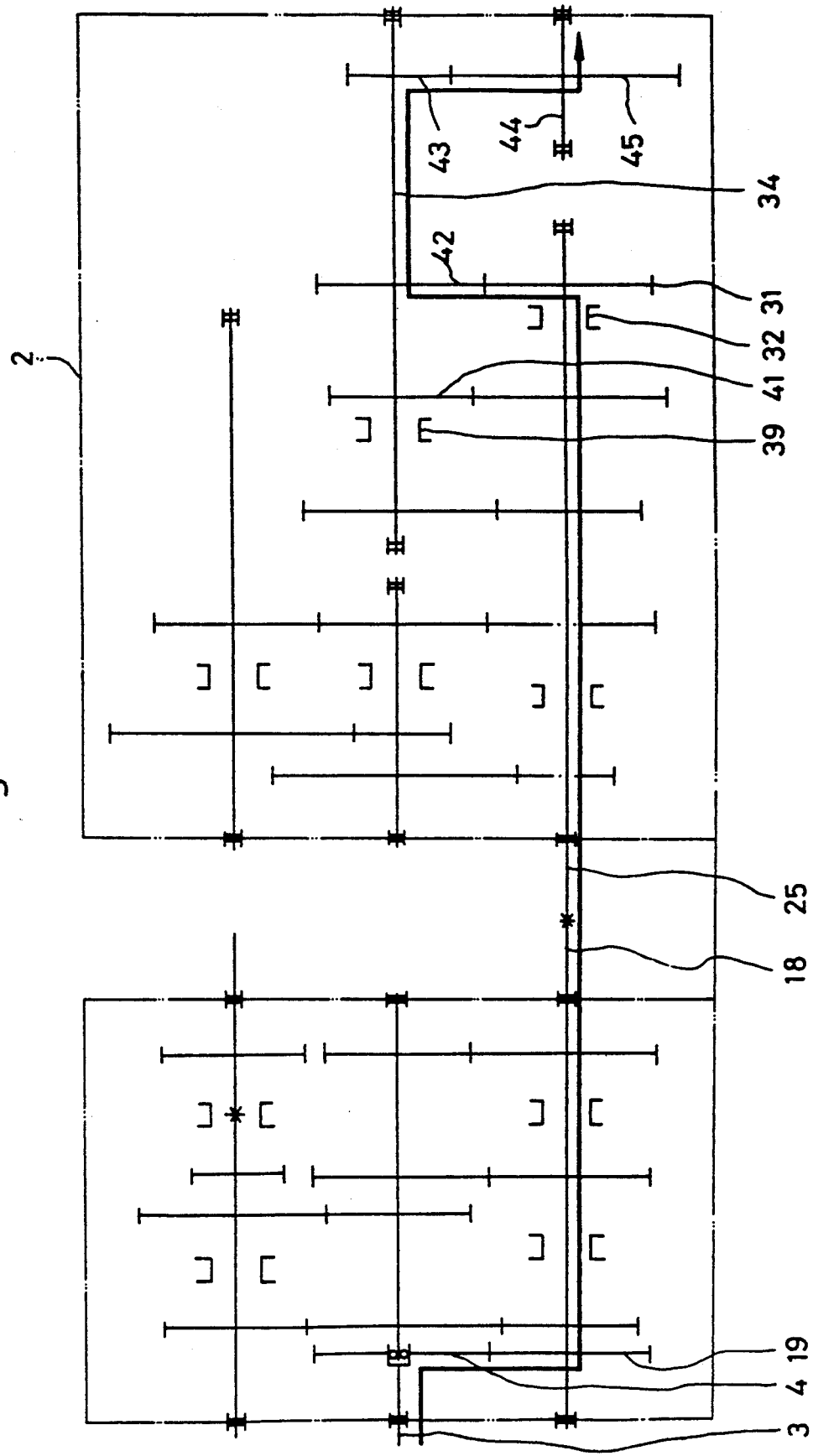

When the PTO speed changing lever is changed to the speed 3 position, the hub sleeves (32)(39) of the supplementary reduction transmission (2) are engaged with the transmission gears (31)(41) and engine power is transmitted in the order of 3, 4, 19, 18, 25, 31, 42, 34, 43, 45 and 44 and the PTO output is thereby generated as shown in FIG. 30.

PTO Speed 4.

Figure 31:
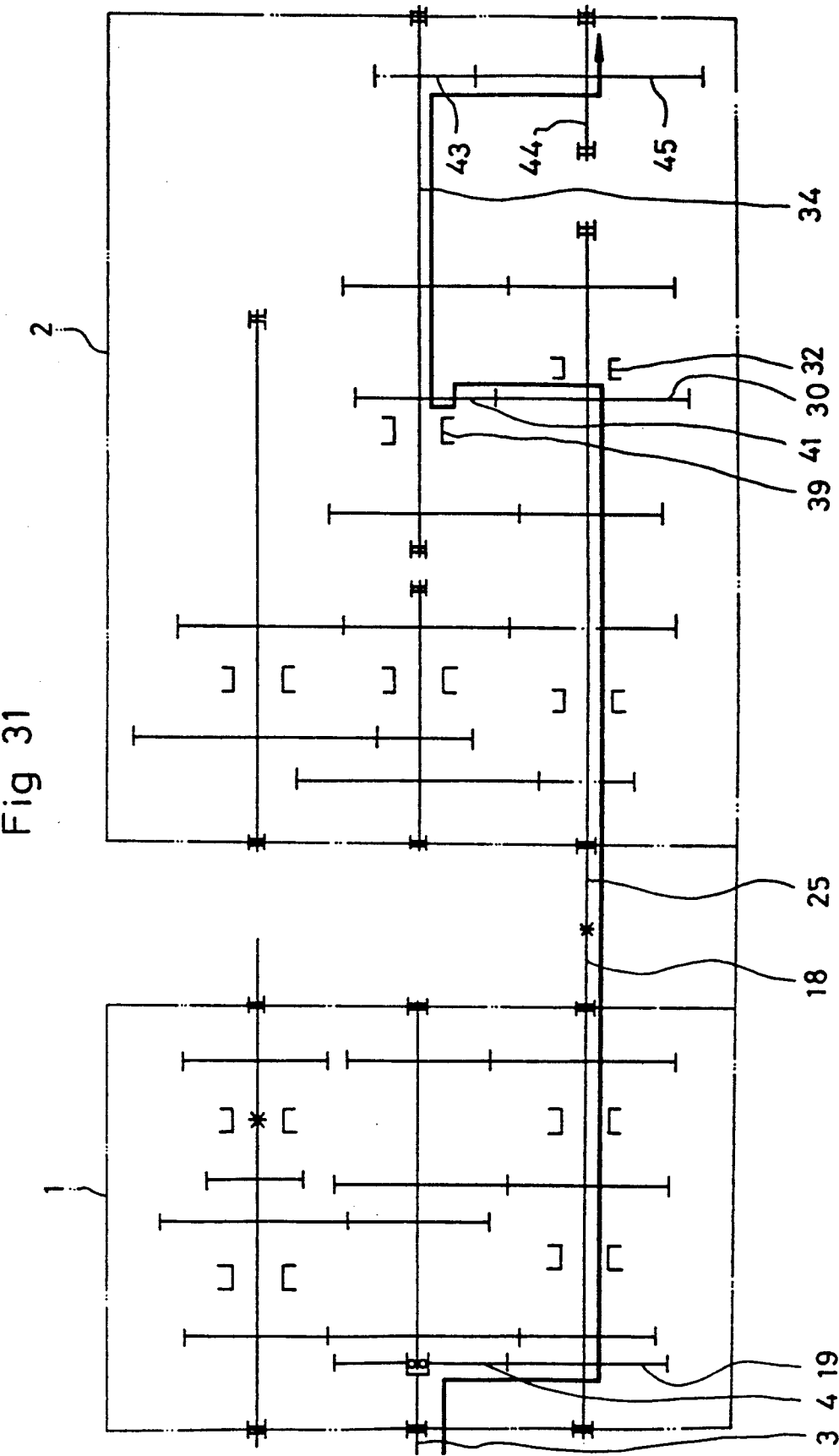

When the PTO changing lever is changed to the speed 4 position, the hub sleeves (32)(39) are engaged with the transmission gears (30)(41) and the engine power is transmitted in the order of 3, 4, 19, 18, 25, 30, 41, 34, 43, 45 and 44 and the PTO output is thereby generated as shown in FIG. 31.

As heretofore described, the present invention uses a number of speed changing steps of the main transmission, specifically 5 forward movement steps and 3 backward movement steps and the number of speed changing steps of the supplementary reduction transmission into 3 travelling speed steps and 4 PTO steps by using 11 shafts, 27 transmission gears and 9 hub sleeves and can easily generate the travelling output of 15 forward movement steps, 9 backward movement steps and 4 PTO steps by mutually uniting and changing the main speed changing part and the supplementary speed changing part.

As the present invention makes it easy to change speed at a number of steps proper to a job site by simplifying the structure of the transmission (the number of gears is reduced) to the utmost but fractionalizing the number of speed changing steps, namely, generating the output of 15 forward movement steps, 9 backward movement steps and 4 PTO steps, a tractor moves quickly and its efficiency of work is considerably promoted. Consequently, power consumption is reduced and the expected life span of the equipment can be prolonged. Since a large number of identically standardized gears and hub sleeves are used, their productivity can be raised and disassembly for maintenance is very easy. Moreover, power transmission routes are so simple that a change of PTO speed is easy.

What is claimed is:

1. A farm tractor transmission comprising a main transmission and a supplementary transmission; a forward movement input shaft and a main transmission output shaft arranged for rotation within said main transmission; a travelling output shaft mounted for rotation within said supplementary transmission; a first input shaft mounted for rotation within said main transmission; a first transmission shaft mounted for rotation within said main transmission; a second transmission shaft mounted for rotation within said supplementary transmission; a first PTO transmission shaft mounted for rotation within said supplementary transmission; a guide shaft mounted for rotation within said supplementary transmission and connected to said main transmission output shaft; a PTO output shaft mounted for rotation within said supplementary transmission; a second PTO transmission shaft mounted for rotation within said supplementary transmission; a PTO second input shaft mounted for rotation within said main transmission and connected to said first PTO transmission shaft; all said shafts having their axes arranged substantially parallel to each other; first gear means arranged on said forward movement input shaft; second gear means arranged on said main transmission output shaft for generating travelling and PTO outputs of the tractor; third gear means arranged on said first input shaft; fourth gear means arranged on said first transmission shaft; fifth gear means arranged on said PTO second input shaft; sixth gear means arranged on said travelling output shaft; seventh and eighth gear means arranged on said second transmission shaft; ninth gear means arranged on said second PTO transmission shaft; tenth gear means arranged on said first PTO transmission shaft; eleventh gear means arranged on said guide shaft; and twelfth gear means arranged on said PTO output shaft, said fourth gear means being arranged to couple with said first, second and fifth gear means within said main transmission, said third gear means being arranged to couple with said fifth gear means within said main transmission, said eighth gear means being arranged to be coupled with said sixth and eleventh gear means within said supplementary transmission, said seventh and eleventh gear means being arranged to be coupled within said supplementary transmission, said ninth gear means being arranged to be coupled with said tenth and twelfth gear means within said supplementary transmission.

2. A farm tractor transmission as defined in claim 1, wherein said third gear means is integrally formed with said first input shaft.

3. A farm tractor transmission as defined in claim 1, wherein said first gear means includes two gears separated by a hub sleeve.

4. A farm tractor transmission as defined in claim 1, wherein said second gear means includes two gears separated by a hub sleeve for selecting forward or backward movement.

5. A farm tractor transmission as defined in claim 1, wherein said sixth gear means comprises two gears separated by a hub sleeve.

6. A farm tractor transmission as defined in claim 1, wherein eighth gear means comprises two gears separated by a hub sleeve.

7. A farm tractor transmission as defined in claim 1, wherein eleventh gear means comprises two gears separated by a hub sleeve.

8. A farm tractor transmission as defined in claim 1, wherein said fifth gear means comprises three spaced gears with a hub sleeve between at least two adjacent gears.

9. A farm tractor transmission as defined in claim 1, wherein said ninth and tenth gear means each including a plurality of spaced gears at least two adjacent ones of which are separated by a hub sleeve.

10. A farm tractor transmission as defined in claim 1, wherein said PTO second input and said first PTO transmission shafts are coaxially aligned.

11. A farm tractor transmission as defined in claim 1, wherein said forward movement input, main transmission output and guide shafts are coaxially aligned.

12. A farm tractor transmission as defined in claim 1, wherein said first input, first and second transmission and second PTO transmission shafts are coaxially aligned.

13. A farm tractor transmission as defined in claim 1, wherein said PTO output and travelling output shafts are on substantially diametrically opposite sides in relation to the axis of said first input shaft.

14. A farm tractor transmission as defined in claim 1, wherein said shafts are arranged substantially along a circular path centered about an axis along which said first input shaft, first transmission shaft, second transmission shaft and second PTO transmission shaft are coaxially aligned.

15. A farm tractor transmission as defined in claim 1, wherein said main transmission has upper and lower parts, said upper part containing said forward movement input and main transmission output shafts.

16. A farm tractor transmission as defined in claim 1, wherein said supplementary transmission has upper, central and lower parts, said travelling output shaft being located in said upper part, said ninth gear means on said second PTO transmission shaft being located in said central part and said first PTO transmission shaft being located in said lower part.

17. A farm tractor transmission as defined in claim 1, wherein said second gear means includes at least one gear which comprises means for providing backward movement speed change.

* * * * *